US008271661B2

(12) United States Patent
Harris et al.

(10) Patent No.: US 8,271,661 B2
(45) Date of Patent: *Sep. 18, 2012

(54) SYSTEMS AND METHODS OF PROVIDING SERVER INITIATED CONNECTIONS ON A VIRTUAL PRIVATE NETWORK

(75) Inventors: James Harris, San Jose, CA (US); Arkesh Kumar, Santa Clara, CA (US); Charu Venkatraman, Bangalore (IN); Ajay Soni, San Jose, CA (US); Junxiao He, Saratoga, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 1 day.

This patent is subject to a terminal disclaimer.

(21) Appl. No.: 12/823,643

(22) Filed: Jun. 25, 2010

(65) Prior Publication Data
US 2010/0281162 A1 Nov. 4, 2010

Related U.S. Application Data

(63) Continuation of application No. 11/465,950, filed on Aug. 21, 2006, now Pat. No. 7,769,869.

(51) Int. Cl.
*G06F 15/16* (2006.01)
(52) U.S. Cl. ........ 709/227; 709/202; 709/203; 709/230; 709/244; 709/249
(58) Field of Classification Search .................. 709/203, 709/227, 230, 238, 218, 228, 244, 249, 202
See application file for complete search history.

(56) References Cited

U.S. PATENT DOCUMENTS 5,835,725 A * 11/1998 Chiang et al. ................. 709/228
(Continued)

FOREIGN PATENT DOCUMENTS
WO    WO-01/47185 A2    6/2001
(Continued)

OTHER PUBLICATIONS

Office Action for U.S. Appl. No. 11/462,174 dated Jul. 28, 2009.
(Continued)

*Primary Examiner* — Michael Won
(74) *Attorney, Agent, or Firm* — Foley & Lardner LLP; Christopher McKenna

(57) ABSTRACT

The present invention is related to a method for establishing via an appliance a transport layer protocol connection initiated by a server on a first network to a client connected from a second network to the first network via a secure socket layer virtual private network (SSL VPN) connection. The method includes the step of receiving, by an appliance, a transport layer connection request from a server on a first network to connect to a client connected to the first network via a SSL VPN connection from a second network. The transport layer connection request identifies a client destination internet protocol address and a client destination port on the first network. The method includes establishing, by the appliance, a first transport layer connection to the server on the first network, determining, by the appliance, the client on the second network associated with the client destination internet protocol address on the first network, and transmitting, by the appliance, connection information identifying the client destination port to an agent on the client. The agent establishes a second transport layer connection to the client destination port using a local internet protocol address of the client on the second network and establishes a third transport layer connection to the appliance, which it associates with the second transport layer connection.

20 Claims, 9 Drawing Sheets

U.S. PATENT DOCUMENTS

| | | | |
|---|---|---|---|
| 6,049,826 A * | 4/2000 | Beser | 709/222 |
| 6,151,631 A * | 11/2000 | Ansell et al. | 709/229 |
| 6,189,102 B1 * | 2/2001 | Beser | 726/2 |
| 6,272,148 B1 | 8/2001 | Takagi et al. | |
| 6,324,582 B1 * | 11/2001 | Sridhar et al. | 709/230 |
| 6,353,614 B1 * | 3/2002 | Borella et al. | 370/389 |
| 6,381,646 B2 * | 4/2002 | Zhang et al. | 709/227 |
| 6,480,508 B1 * | 11/2002 | Mwikalo et al. | 370/475 |
| 6,490,289 B1 * | 12/2002 | Zhang et al. | 370/401 |
| 6,567,405 B1 * | 5/2003 | Borella et al. | 370/389 |
| 6,598,081 B1 * | 7/2003 | Coile et al. | 709/227 |
| 6,611,875 B1 * | 8/2003 | Chopra et al. | 709/245 |
| 6,614,809 B1 * | 9/2003 | Verma et al. | 370/469 |
| 6,631,416 B2 | 10/2003 | Bendinelli et al. | |
| 6,920,502 B2 | 7/2005 | Araujo et al. | |
| 6,983,319 B1 * | 1/2006 | Lu et al. | 709/227 |
| 7,072,933 B1 * | 7/2006 | Lamb et al. | 709/203 |
| 7,216,173 B2 | 5/2007 | Clayton et al. | |
| 7,240,150 B1 | 7/2007 | Todd et al. | |
| 7,246,373 B1 * | 7/2007 | Leung et al. | 726/15 |
| 7,386,881 B2 * | 6/2008 | Swander et al. | 726/14 |
| 7,403,535 B2 * | 7/2008 | Modi et al. | 370/401 |
| 7,450,560 B1 * | 11/2008 | Grabelsky et al. | 370/352 |
| 7,451,193 B1 * | 11/2008 | Coile et al. | 709/227 |
| 7,461,150 B1 * | 12/2008 | Boulia | 709/227 |
| 7,685,255 B2 * | 3/2010 | Amlekar et al. | 709/217 |
| 7,761,597 B2 * | 7/2010 | Takeda et al. | 709/245 |
| 7,769,869 B2 * | 8/2010 | Venkatraman et al. | 709/227 |
| 7,769,871 B2 * | 8/2010 | Boulia | 709/227 |
| 7,827,237 B2 * | 11/2010 | Plamondon | 709/203 |
| 7,870,277 B2 * | 1/2011 | Korrapati et al. | 709/230 |
| 7,916,047 B2 * | 3/2011 | Samuels et al. | 341/67 |
| 7,925,693 B2 * | 4/2011 | Swander et al. | 709/203 |
| 2001/0030970 A1 | 10/2001 | Wiryaman et al. | |
| 2002/0042875 A1 | 4/2002 | Shukla | |
| 2002/0133598 A1 | 9/2002 | Strahm et al. | |
| 2002/0199007 A1 | 12/2002 | Clayton et al. | |
| 2003/0131079 A1 | 7/2003 | Neale et al. | |
| 2004/0015591 A1 | 1/2004 | Wang | |
| 2004/0024882 A1 | 2/2004 | Austin et al. | |
| 2004/0177158 A1 * | 9/2004 | Bauch et al. | 709/245 |
| 2004/0210320 A1 | 10/2004 | Pandya | |
| 2006/0080441 A1 | 4/2006 | Chen et al. | |
| 2006/0126619 A1 * | 6/2006 | Teisberg et al. | 370/389 |
| 2006/0179147 A1 * | 8/2006 | Tran et al. | 709/227 |
| 2007/0245409 A1 | 10/2007 | Harris et al. | |
| 2008/0034072 A1 * | 2/2008 | He et al. | 709/223 |
| 2008/0034111 A1 * | 2/2008 | Kamath et al. | 709/238 |
| 2008/0034416 A1 * | 2/2008 | Kumar et al. | 726/15 |
| 2008/0189393 A1 * | 8/2008 | Wagner | 709/218 |
| 2008/0320154 A1 * | 12/2008 | Demmer et al. | 709/229 |
| 2009/0063657 A1 * | 3/2009 | Samuels et al. | 709/218 |
| 2010/0023582 A1 * | 1/2010 | Pedersen et al. | 709/203 |
| 2010/0088398 A1 * | 4/2010 | Plamondon | 709/220 |
| 2010/0131659 A1 * | 5/2010 | Narayana et al. | 709/228 |
| 2010/0241694 A1 * | 9/2010 | Jensen et al. | 709/203 |
| 2010/0281112 A1 * | 11/2010 | Plamondon | 709/203 |
| 2010/0281162 A1 * | 11/2010 | Venkatraman et al. | 709/224 |
| 2010/0287227 A1 * | 11/2010 | Goel et al. | 709/202 |
| 2010/0318665 A1 * | 12/2010 | Demmer et al. | 709/227 |

FOREIGN PATENT DOCUMENTS

| | | |
|---|---|---|
| WO | WO-2006012612 | 2/2006 |
| WO | WO-2006/074072 | 7/2006 |

OTHER PUBLICATIONS

Office Action for U.S. Appl. No. 11/465,950 dated Jul. 2, 2009.
Notice of Allowance for U.S. Appl. No. 11/465,950 dated Jan. 28, 2010.
Advisory Action for U.S. Appl. No. 11/462,174 dated May 4, 2010.
Office Action for U.S. Appl. No. 11/462,174 dated Feb. 19, 2010.
Supplemental Notice of Allowance for U.S. Appl. No. 11/465,950 dated Mar. 23, 2010 (5 pages).
Notice of Allowance for U.S. Appl. No. 11/465,950 dated Jan. 28, 2010 (4 pages).
Office Action for U.S. Appl. No. 11/462,174 dated Feb. 19, 2010 (13 pages).
Office Action for U.S. Appl. No. 11/462,174 dated Jul. 28, 2009 (10 pages).

* cited by examiner

SYSTEMS AND METHODS OF PROVIDING SERVER INITIATED CONNECTIONS ON A VIRTUAL PRIVATE NETWORK

RELATED APPLICATION

This present application claims priority to and is a continuation of U.S. patent application Ser. No. 11/465,950, entitled "SYSTEMS AND METHODS OF PROVIDING SERVER INITIATED CONNECTIONS ON A VIRTUAL PRIVATE NETWORK", filed Aug. 21, 2006, which is incorporated herein by reference in its entirety.

FIELD OF THE DISCLOSURE

The present invention generally relates to data communication networks and, in particular, to systems and methods for providing server initiated connections to a client connected via a secure socket layer virtual private network connection.

BACKGROUND

In conventional systems, virtual private networks (VPN) provide a client computer with secure access to a private network. Typically, the client is assigned an internet protocol (IP) address on the private network after a VPN server authenticates the client. Once the client is authenticated and can access the VPN, the client may securely access resources residing on the private network. In many cases, VPNs provide a remote client on a public network access to server on a private network, such as a corporate network. In some cases, the VPN connected client also has resources that would be useful to access by a computing device on the private network, such as a server. For example, the VPN connected client may have files to be transferred to the private network. However, a virtual private network system may not enable a computing device on the private network to initiate and establish a connection to a virtual private network connected client.

It would, therefore, be desirable to provide systems and methods for efficiently allowing a server in a private network to initiate a connection to a remote client connected to the private network via a virtual private network connection.

BRIEF SUMMARY

The present solution of the appliance and client agent described herein provides techniques for allowing efficient and transparent server initiated connections over a virtual private network connection to a client. As such, servers and SSL VPN clients can transparently communicate via connections established by either the server or the client. The SSL VPN clients seamlessly appear as clients on the network accessed or managed by the appliance. This enables SSL VPN users to take advantage of applications, such as collaboration tools, that use server initiated connections. Additionally, clients of SSL VPN users can provide access to applications and collaboration tools to the other clients and servers on the private network accessed via the virtual private network connection.

In one aspect, the present invention is related to a method for establishing via an appliance a transport layer protocol connection initiated by a server on a first network to a client connected from a second network to the first network via a secure socket layer virtual private network (SSL VPN) connection. The method includes the step of receiving, by an appliance, a transport layer connection request from a server on a first network to connect to a client connected to the first network via a SSL VPN connection from a second network. The transport layer connection request identifies a client destination internet protocol address and a client destination port on the first network. The method includes establishing, by the appliance, a first transport layer connection to the server on the first network, determining, by the appliance, the client on the second network associated with the client destination internet protocol address on the first network, and transmitting, by the appliance, connection information identifying the client destination port to an agent on the client. The agent establishes a second transport layer connection to the client destination port using a local internet protocol address of the client on the second network and establishes a third transport layer connection to the appliance. The agent associates the third transport layer connection with the second transport layer connection. In one embodiment, the agent comprises a web browser plug-in.

In some embodiments, the method includes linking, by the appliance, the first transport layer connection to the server with the third transport layer connection to the agent of the client. In another embodiment, the method includes generating, by the appliance, a first connection record for the first transport layer connection to the server, receiving, by the appliance, a second connection record from the agent for the third transport layer connection, and associating, by the appliance, the first connection record with the second connection record. In one embodiment, the method includes transmitting, by the appliance, to the agent via a control channel connection established between the appliance and the agent. In some embodiments, the connection information transmitted from the appliance to the agent includes a protocol, a server internet protocol address, or a server source port.

In another embodiment, the method includes the appliance forwarding, data received from a server internet protocol address and server source port to an internet protocol address and port used by the agent for the third transport layer connection. In some of these embodiments, the agent provides the data to the application via the second transport layer connection.

In one embodiment, the method includes transmitting, by the client, via the appliance a request to the server to transmit the transport layer connection request. In another embodiment, the appliance determines via content of an application layer protocol used for communications between the client and the server a server destination internet protocol address and server port or the client destination internet protocol address and client destination port. In some embodiments, the appliance modifies the content of the application layer protocol transmitted to the server to identify an internet protocol address of the client on the first network.

In yet another embodiment, the method includes determining, by the appliance, a second server initiated transport layer connection request to the client exceeds a predetermined threshold identifying a number of server initiated transport layer connections allowed to the client, and not establishing, by the appliance, the second server initiated transport layer connection.

The details of various embodiments of the invention are set forth in the accompanying drawings and the description below.

BRIEF DESCRIPTION OF THE FIGURES

The foregoing and other objects, aspects, features, and advantages of the invention will become more apparent and better understood by referring to the following description taken in conjunction with the accompanying drawings, in which.

Figure 1A:
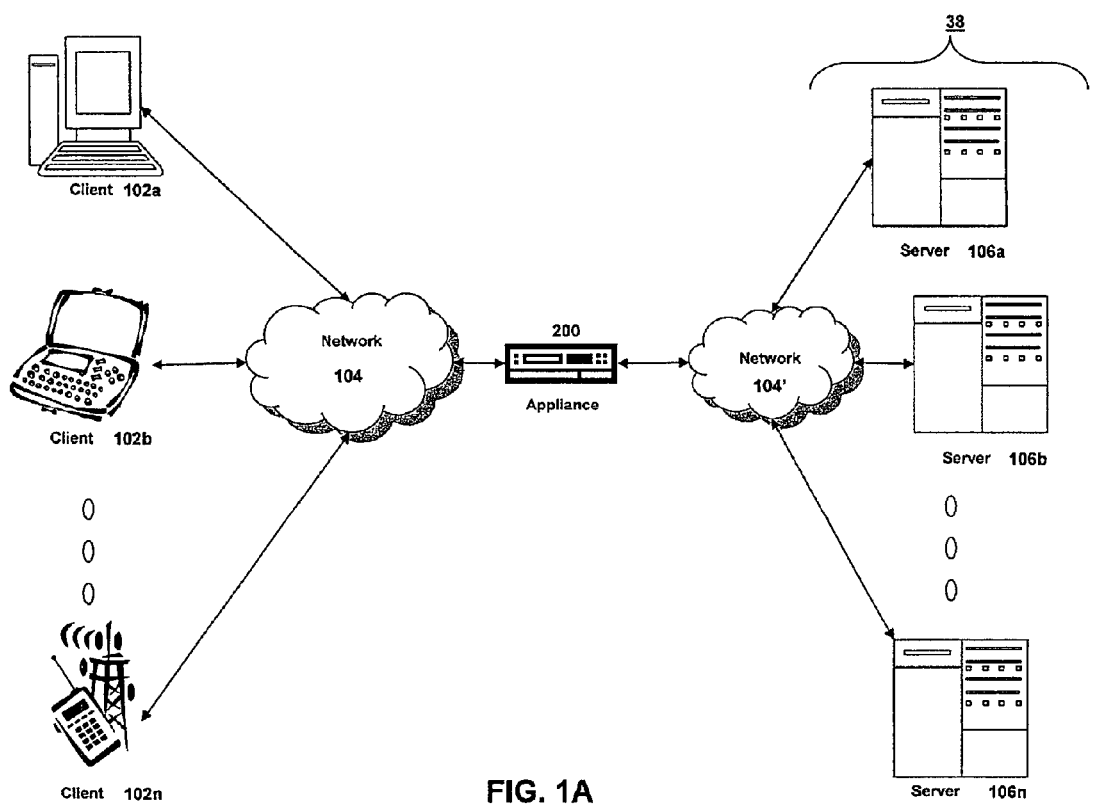
FIG. 1A is a block diagram of an embodiment of a network environment for a client to access a server via an appliance.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

A. Network and Computing Environment

Prior to discussing the specifics of embodiments of the systems and methods of an appliance and/or client, it may be helpful to discuss the network and computing environments in which such embodiments may be deployed. Referring now to FIG. 1A, an embodiment of a network environment is depicted. In brief overview, the network environment comprises one or more clients 102a-102n (also generally referred to as local machine(s) 102, or client(s) 102) in communication with one or more servers 106a-106n (also generally referred to as server(s) 106, or remote machine(s) 106) via one or more networks 104, 104' (generally referred to as network 104). In some embodiments, a client 102 communicates with a server 106 via an appliance 200.

Although FIG. 1A shows a network 104 and a network 104' between the clients 102 and the servers 106, the clients 102 and the servers 106 may be on the same network 104. The networks 104 and 104' can be the same type of network or different types of networks. The network 104 and/or the network 104' can be a local-area network (LAN), such as a company Intranet, a metropolitan area network (MAN), or a wide area network (WAN), such as the Internet or the World Wide Web. In one embodiment, network 104' may be a private network and network 104 may be a public network. In some embodiments, network 104 may be a private network and network 104' a public network. In another embodiment, networks 104 and 104' may both be private networks. In some embodiments, clients 102 may be located at a branch office of a corporate enterprise communicating via a WAN connection over the network 104 to the servers 106 located at a corporate data center.

The network 104 and/or 104' be any type and/or form of network and may include any of the following: a point to point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some embodiments, the network 104 may comprise a wireless link, such as an infrared channel or satellite band. The topology of the network 104 and/or 104' may be a bus, star, or ring network topology. The network 104 and/or 104' and network topology may be of any such network or network topology as known to those ordinarily skilled in the art capable of supporting the operations described herein.

As shown in FIG. 1A, the appliance 200, which also may be referred to as an interface unit 200 or gateway 200, is shown between the networks 104 and 104'. In some embodiments, the appliance 200 may be located on network 104. For example, a branch office of a corporate enterprise may deploy an appliance 200 at the branch office. In other embodiments, the appliance 200 may be located on network 104'. For example, an appliance 200 may be located at a corporate data center. In yet another embodiment, a plurality of appliances 200 may be deployed on network 104. In some embodiments, a plurality of appliances 200 may be deployed on network 104'. In one embodiment, a first appliance 200 communicates with a second appliance 200'. In other embodiments, the appliance 200 could be a part of any client 102 or server 106 on the same or different network 104,104' as the client 102. One or more appliances 200 may be located at any point in the network or network communications path between a client 102 and a server 106.

In one embodiment, the system may include multiple, logically-grouped servers 106. In these embodiments, the logical group of servers may be referred to as a server farm 38. In some of these embodiments, the serves 106 may be geographically dispersed. In some cases, a farm 38 may be administered as a single entity. In other embodiments, the server farm 38 comprises a plurality of server farms 38. In one embodiment, the server farm executes one or more applications on behalf of one or more clients 102.

The servers 106 within each farm 38 can be heterogeneous. One or more of the servers 106 can operate according to one type of operating system platform (e.g., WINDOWS NT, manufactured by Microsoft Corp. of Redmond, Wash.), while one or more of the other servers 106 can operate on according to another type of operating system platform (e.g., Unix or Linux). The servers 106 of each farm 38 do not need to be physically proximate to another server 106 in the same farm 38. Thus, the group of servers 106 logically grouped as a farm 38 may be interconnected using a wide-area network (WAN) connection or medium-area network (MAN) connection. For example, a farm 38 may include servers 106 physically located in different continents or different regions of a continent, country, state, city, campus, or room. Data transmission speeds between servers 106 in the farm 38 can be increased if the servers 106 are connected using a local-area network (LAN) connection or some form of direct connection.

Servers 106 may be referred to as a file server, application server, web server, proxy server, or gateway server. In some embodiments, a server 106 may have the capacity to function as either an application server or as a master application server. In one embodiment, a server 106 may include an Active Directory. The clients 102 may also be referred to as client nodes or endpoints. In some embodiments, a client 102 has the capacity to function as both a client node seeking access to applications on a server and as an application server providing access to hosted applications for other clients 102a-102n.

In some embodiments, a client 102 communicates with a server 106. In one embodiment, the client 102 communicates directly with one of the servers 106 in a farm 38. In another embodiment, the client 102 executes a program neighborhood application to communicate with a server 106 in a farm 38. In still another embodiment, the server 106 provides the functionality of a master node. In some embodiments, the client 102 communicates with the server 106 in the farm 38 through a network 104. Over the network 104, the client 102 can, for example, request execution of various applications hosted by the servers 106a-106n in the farm 38 and receive output of the results of the application execution for display. In some embodiments, only the master node provides the functionality required to identify and provide address information associated with a server 106' hosting a requested application.

In one embodiment, the server 106 provides functionality of a web server. In another embodiment, the server 106a receives requests from the client 102, forwards the requests to a second server 106b and responds to the request by the client 102 with a response to the request from the server 106b. In still another embodiment, the server 106 acquires an enumeration of applications available to the client 102 and address information associated with a server 106 hosting an application identified by the enumeration of applications. In yet another embodiment, the server 106 presents the response to the request to the client 102 using a web interface. In one embodiment, the client 102 communicates directly with the server 106 to access the identified application. In another embodiment, the client 102 receives application output data, such as display data, generated by an execution of the identified application on the server 106.

Figure 1B:
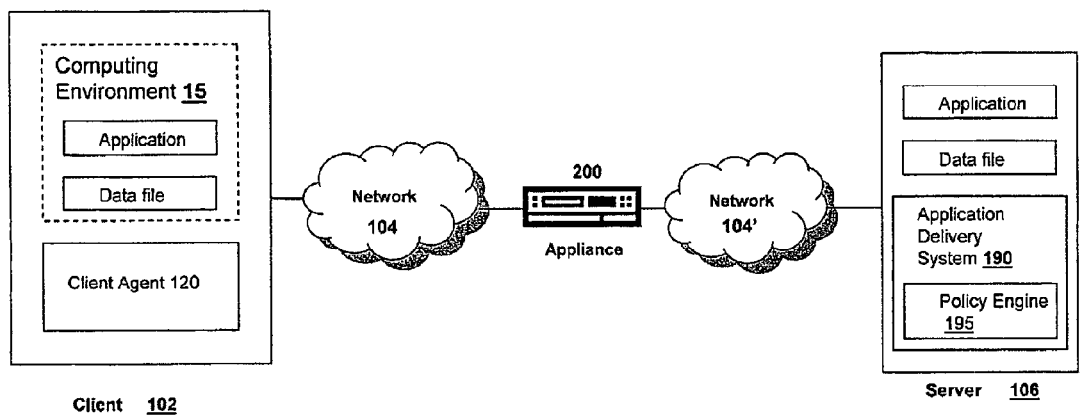
FIG. 1B is a block diagram of an embodiment of an environment for delivering a computing environment from a server to a client via an appliance.

Referring now to FIG. 1B, a network environment for delivering and/or operating a computing environment on a client 102 is depicted. In some embodiments, a server 106 includes an application delivery system 190 for delivering a computing environment or an application and/or data file to one or more clients 102. In brief overview, a client 10 is in communication with a server 106 via network 104, 104' and appliance 200. For example, the client 102 may reside in a remote office of a company, e.g., a branch office, and the server 106 may reside at a corporate data center. The client 102 comprises a client agent 120, and a computing environment 15. The computing environment 15 may execute or operate an application that accesses, processes or uses a data file. The computing environment 15, application and/or data file may be delivered via the appliance 200 and/or the server 106.

In some embodiments, the appliance 200 accelerates delivery of a computing environment 15, or any portion thereof, to a client 102. In one embodiment, the appliance 200 accelerates the delivery of the computing environment 15 by the application delivery system 190. For example, the embodiments described herein may be used to accelerate delivery of a streaming application and data file processable by the application from a central corporate data center to a remote user location, such as a branch office of the company. In another embodiment, the appliance 200 accelerates transport layer traffic between a client 102 and a server 106. The appliance 200 may provide acceleration techniques for accelerating any transport layer payload from a server 106 to a client 102, such as: 1) transport layer connection pooling, 2) transport layer connection multiplexing, 3) transport control protocol buffering, 4) compression and 5) caching. In some embodiments, the appliance 200 provides load balancing of servers 106 in responding to requests from clients 102. In other embodiments, the appliance 200 acts as a proxy or access server to provide access to the one or more servers 106. In another embodiment, the appliance 200 provides a secure virtual private network connection from a first network 104 of the client 102 to the second network 104' of the server 106, such as an SSL VPN connection. It yet other embodiments, the appliance 200 provides application firewall security, control and management of the connection and communications between a client 102 and a server 106.

In some embodiments, the application delivery management system 190 provides application delivery techniques to deliver a computing environment to a desktop of a user, remote or otherwise, based on a plurality of execution methods and based on any authentication and authorization policies applied via a policy engine 195. With these techniques, a remote user may obtain a computing environment and access to server stored applications and data files from any network connected device 100. In one embodiment, the application delivery system 190 may reside or execute on a server 106. In another embodiment, the application delivery system 190 may reside or execute on a plurality of servers 106a-106n. In some embodiments, the application delivery system 190 may execute in a server farm 38. In one embodiment, the server 106 executing the application delivery system 190 may also store or provide the application and data file. In another embodiment, a first set of one or more servers 106 may execute the application delivery system 190, and a different server 106n may store or provide the application and data file. In some embodiments, each of the application delivery system 190, the application, and data file may reside or be located on different servers. In yet another embodiment, any portion of the application delivery system 190 may reside, execute or be stored on or distributed to the appliance 200, or a plurality of appliances.

The client 102 may include a computing environment 15 for executing an application that uses or processes a data file. The client 102 via networks 104, 104' and appliance 200 may request an application and data file from the server 106. In one embodiment, the appliance 200 may forward a request from the client 102 to the server 106. For example, the client 102 may not have the application and data file stored or accessible locally. In response to the request, the application delivery system 190 and/or server 106 may deliver the application and data file to the client 102. For example, in one embodiment, the server 106 may transmit the application as an application stream to operate in computing environment 15 on client 102.

In some embodiments, the application delivery system 190 comprises any portion of the Citrix Access Suite™ by Citrix Systems, Inc., such as the MetaFrame or Citrix Presentation Server™ and/or any of the Microsoft® Windows Terminal Services manufactured by the Microsoft Corporation. In one embodiment, the application delivery system 190 may deliver one or more applications to clients 102 or users via a remote-display protocol or otherwise via remote-based or server-based computing. In another embodiment, the application delivery system 190 may deliver one or more applications to clients or users via steaming of the application.

In one embodiment, the application delivery system 190 includes a policy engine 195 for controlling and managing the access to, selection of application execution methods and the delivery of applications. In some embodiments, the policy engine 195 determines the one or more applications a user or client 102 may access. In another embodiment, the policy engine 195 determines how the application should be delivered to the user or client 102, e.g., the method of execution. In some embodiments, the application delivery system 190 provides a plurality of delivery techniques from which to select a method of application execution, such as a server-based computing, streaming or delivering the application locally to the client 102 for local execution.

In one embodiment, a client 102 requests execution of an application program and the application delivery system 190 comprising a server 106 selects a method of executing the application program. In some embodiments, the server 106 receives credentials from the client 102. In another embodiment, the server 106 receives a request for an enumeration of available applications from the client 102. In one embodiment, in response to the request or receipt of credentials, the application delivery system 190 enumerates a plurality of application programs available to the client 102. The application delivery system 190 receives a request to execute an enumerated application. The application delivery system 190 selects one of a predetermined number of methods for executing the enumerated application, for example, responsive to a policy of a policy engine. The application delivery system 190 may select a method of execution of the application enabling the client 102 to receive application-output data generated by execution of the application program on a server 106. The application delivery system 190 may select a method of execution of the application enabling the local machine 10 to execute the application program locally after retrieving a plurality of application files comprising the application. In yet another embodiment, the application delivery system 190 may select a method of execution of the application to stream the application via the network 104 to the client 102.

A client 102 may execute, operate or otherwise provide an application, which can be any type and/or form of software, program, or executable instructions such as any type and/or form of web browser, web-based client, client-server application, a thin-client computing client, an ActiveX control, or a Java applet, or any other type and/or form of executable instructions capable of executing on client 102. In some embodiments, the application may be a server-based or a remote-based application executed on behalf of the client 102 on a server 106. In one embodiments the server 106 may display output to the client 102 using any thin-client or remote-display protocol, such as the Independent Computing Architecture (ICA) protocol manufactured by Citrix Systems, Inc. of Ft. Lauderdale, Fla. or the Remote Desktop Protocol (RDP) manufactured by the Microsoft Corporation of Redmond, Wash. The application can use any type of protocol and it can be, for example, an HTTP client, an FTP client, an Oscar client, or a Telnet client. In other embodiments, the application comprises any type of software related to VoIP communications, such as a soft IP telephone. In further embodiments, the application comprises any application related to real-time data communications, such as applications for streaming video and/or audio.

In some embodiments, the server 106 or a server farm 38 may be running one or more applications, such as an application providing a thin-client computing or remote display presentation application. In one embodiment, the server 106 or server farm 38 executes as an application, any portion of the Citrix Access Suite™ by Citrix Systems, Inc., such as the MetaFrame or Citrix Presentation Server™, and/or any of the Microsoft® Windows Terminal Services manufactured by the Microsoft Corporation. In one embodiment, the application is an ICA client, developed by Citrix Systems, Inc. of Fort Lauderdale, Fla. In other embodiments, the application includes a Remote Desktop (RDP) client, developed by Microsoft Corporation of Redmond, Wash. Also, the server 106 may run an application, which for example, may be an application server providing email services such as Microsoft Exchange manufactured by the Microsoft Corporation of Redmond, Wash., a web or Internet server, or a desktop sharing server, or a collaboration server. In some embodiments, any of the applications may comprise any type of hosted service or products, such as GoToMeeting™ provided by Citrix Online Division, Inc. of Santa Barbara, Calif., WebEx™ provided by WebEx, Inc. of Santa Clara, Calif., or Microsoft Office Live Meeting provided by Microsoft Corporation of Redmond, Wash.

Figure 1C:
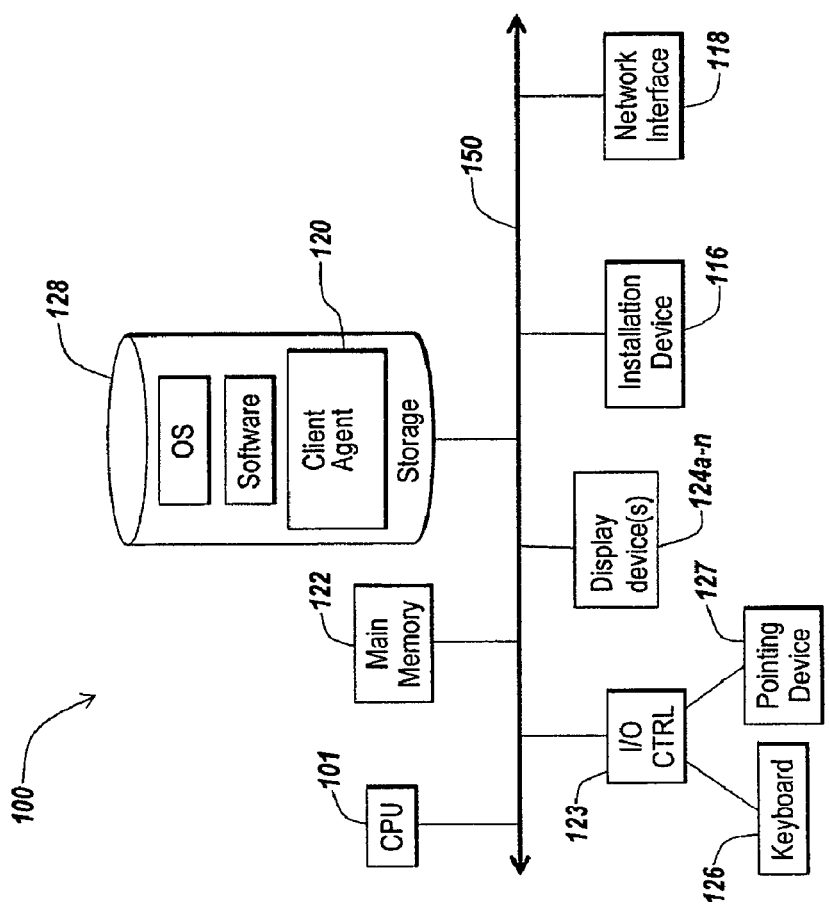
FIGS. 1C and 1D are block diagrams of embodiments of a computing device.
Figure 1D:
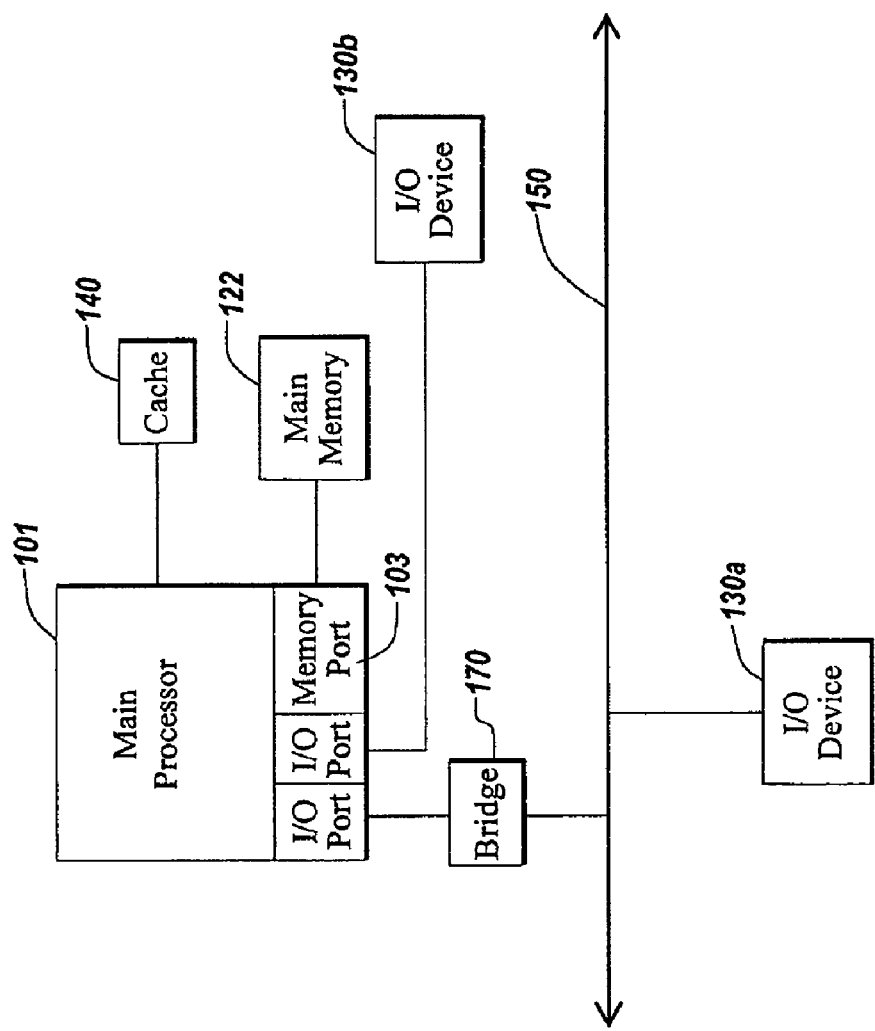

The client 102, server 106, and appliance 200 may be deployed as and/or executed on any type and form of computing device, such as a computer, network device or appliance capable of communicating on any type and form of network and performing the operations described herein. FIGS. 1C and 1D depict block diagrams of a computing device 100 useful for practicing an embodiment of the client 102, server 106 or appliance 200. As shown in FIGS. 1C and 1D, each computing device 100 includes a central processing unit 101, and a main memory unit 122. As shown in FIG. 1C, a computing device 100 may include a visual display device 124, a keyboard 126 and/or a pointing device 127, such as a mouse. Each computing device 100 may also include additional optional elements, such as one or more input/output devices 130a-130b (generally referred to using reference numeral 130), and a cache memory 140 in communication with the central processing unit 101.

The central processing unit 101 is any logic circuitry that responds to and processes instructions fetched from the main memory unit 122. In many embodiments, the central processing unit is provided by a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; the RS/6000 processor, those manufactured by International Business Machines of White Plains, N.Y.; or those manufactured by Advanced Micro Devices of Sunnyvale, Calif. The computing device 100 may be based on any of these processors, or any other processor capable of operating as described herein.

Main memory unit 122 may be one or more memory chips capable of storing data and allowing any storage location to be directly accessed by the microprocessor 101, such as Static random access memory (SRAM), Burst SRAM or Synch-Burst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). The main memory 122 may be based on any of the above described memory chips, or any other available memory chips capable of operating as described herein. In the embodiment shown in FIG. 1C, the processor 101 communicates with main memory 122 via a system bus 150 (described in more detail below). FIG. 1C depicts an embodiment of a computing device 100 in which the processor communicates directly with main memory 122 via a memory port 103. For example, in FIG. 1D the main memory 122 may be DRDRAM.

FIG. 1D depicts an embodiment in which the main processor 101 communicates directly with cache memory 140 via a secondary bus, sometimes referred to as a backside bus. In other embodiments, the main processor 101 communicates with cache memory 140 using the system bus 150. Cache memory 140 typically has a faster response time than main memory 122 and is typically provided by SRAM, BSRAM, or EDRAM. In the embodiment shown in FIG. 1C, the processor 101 communicates with various I/O devices 130 via a local system bus 150. Various busses may be used to connect the central processing unit 101 to any of the I/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 101 may use an Advanced Graphics Port (AGP) to communicate with the display 124. FIG. 1D depicts an embodiment of a computer 100 in which the main processor 101 communicates directly with I/O device 130 via HyperTransport, Rapid I/O, or InfiniBand. FIG. 1D also depicts an embodiment in which local busses and direct communication are mixed: the processor 101 communicates with I/O device 130 using a local interconnect bus while communicating with I/O device 130 directly.

The computing device 100 may support any suitable installation device 116, such as a floppy disk drive for receiving floppy disks such as 3.5-inch, 5.25-inch disks or ZIP disks, a CD-ROM drive, a CD-R/RW drive, a DVD-ROM drive, tape drives of various formats, USB device, hard-drive or any other device suitable for installing software and programs such as any client agent 120, or portion thereof. The computing device 100 may further comprise a storage device 128, such as one or more hard disk drives or redundant arrays of independent disks, for storing an operating system and other related software, and for storing application software programs such as any program related to the client agent 120. Optionally, any of the installation devices 116 could also be used as the storage device 128. Additionally, the operating system and the software can be run from a bootable medium, for example, a bootable CD, such as KNOPPIX®, a bootable CD for GNU/Linux that is available as a GNU/Linux distribution from knoppix.net.

Furthermore, the computing device 100 may include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56kb, X.25), broadband connections (e.g., ISDN, Frame Relay, ATM), wireless connections, or some combination of any or all of the above. The network interface 118 may comprise a built-in network adapter, network interface card, PCMCIA network card, card bus network adapter, wireless network adapter, USB network adapter, modem or any other device suitable for interfacing the computing device 100 to any type of network capable of communication and performing the operations described herein. A wide variety of I/O devices 130a-130n may be present in the computing device 100. Input devices include keyboards, mice, trackpads, trackballs, microphones, and drawing tablets. Output devices include video displays, speakers, inkjet printers, laser printers, and dye-sublimation printers. The I/O devices 130 may be controlled by an I/O controller 123 as shown in FIG. 1C. The I/O controller may control one or more I/O devices such as a keyboard 126 and a pointing device 127, e.g., a mouse or optical pen. Furthermore, an I/O device may also provide storage 128 and/or an installation medium 116 for the computing device 100. In still other embodiments, the computing device 100 may provide USB connections to receive hand-held USB storage devices such as the USB Flash Drive line of devices manufactured by Twintech Industry, Inc. of Los Alamitos, Calif.

In some embodiments, the computing device 100 may comprise or be connected to multiple display devices 124a-124n, which each may be of the same or different type and/or form. As such, any of the I/O devices 130a-130n and/or the I/O controller 123 may comprise any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may comprise multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices, such as computing devices 100a and 100b connected to the computing device 100, for example, via a network. These embodiments may include any type of software designed and constructed to use another computer's display device as a second display device 124a for the computing device 100. One ordinarily skilled in the art will recognize and appreciate the various ways and embodiments that a computing device 100 may be configured to have multiple display devices 124a-124n.

In further embodiments, an I/O device 130 may be a bridge 170 between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, or a Serial Attached small computer system interface bus.

A computing device 100 of the sort depicted in FIGS. 1C and 1D typically operate under the control of operating systems, which control scheduling of tasks and access to system resources. The computing device 100 can be running any operating system such as any of the versions of the Microsoft® Windows operating systems, the different releases of the Unix and Linux operating systems, any version of the Mac OS® for Macintosh computers, any embedded operating system, any real-time operating system, any open source operating system, any proprietary operating system, any operating systems for mobile computing devices, or any other operating system capable of running on the computing device and performing the operations described herein. Typical operating systems include: WINDOWS 3.x, WINDOWS 95, WINDOWS 98, WINDOWS 2000, WINDOWS NT 3.51, WINDOWS NT 4.0, WINDOWS CE, and WINDOWS XP, all of which are manufactured by Microsoft Corporation of Redmond, Wash.; MacOS, manufactured by Apple Computer of Cupertino, Calif.; OS/2, manufactured by International Business Machines of Armonk, N.Y.; and Linux, a freely-available operating system distributed by Caldera Corp. of Salt Lake City, Utah, or any type and/or form of a Unix operating system, among others.

In other embodiments, the computing device 100 may have different processors, operating systems, and input devices consistent with the device. For example, in one embodiment the computer 100 is a Treo 180, 270, 1060, 600 or 650 smart phone manufactured by Palm, Inc. In this embodiment, the Treo smart phone is operated under the control of the PalmOS operating system and includes a stylus input device as well as a five-way navigator device. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

B. Appliance Architecture

Figure 2A:
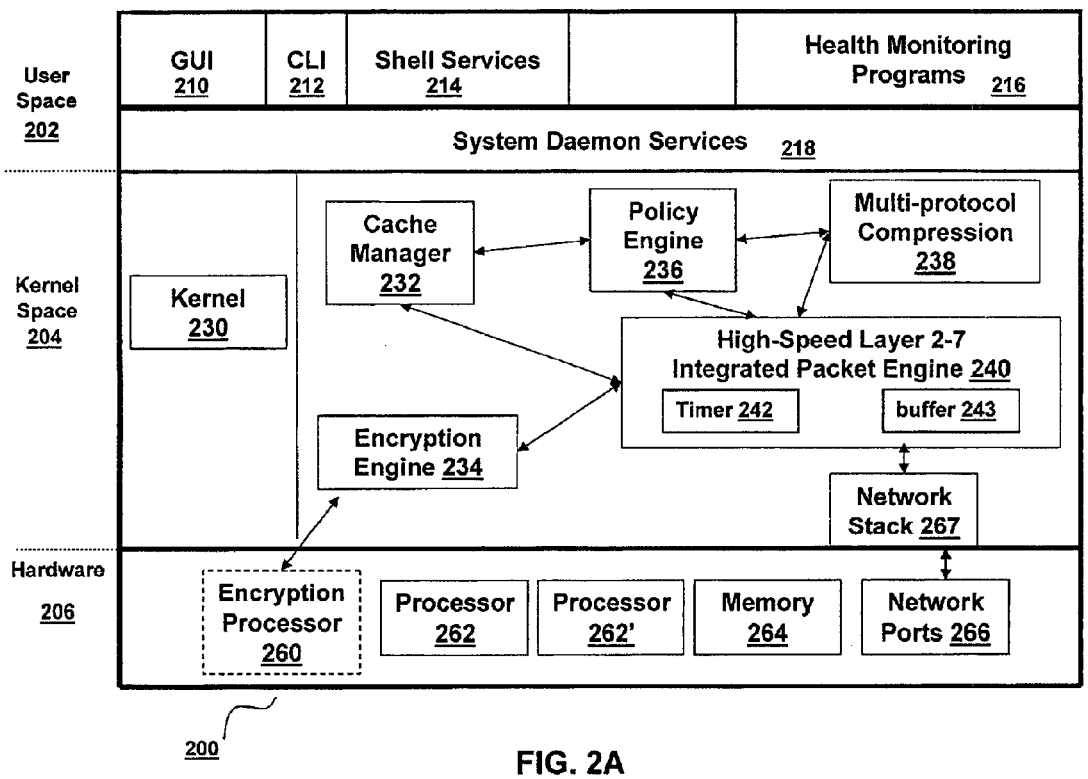
FIG. 2A is a block diagram of an embodiment of an appliance for processing communications between a client and a server.

FIG. 2A illustrates an example embodiment of the appliance 200. The architecture of the appliance 200 in FIG. 2A is provided by way of illustration only and is not intended to be limiting. As shown in FIG. 2, appliance 200 comprises a hardware layer 206 and a software layer divided into a user space 202 and a kernel space 204.

Hardware layer 206 provides the hardware elements upon which programs and services within kernel space 204 and user space 202 are executed. Hardware layer 206 also provides the structures and elements which allow programs and services within kernel space 204 and user space 202 to communicate data both internally and externally with respect to appliance 200. As shown in FIG. 2, the hardware layer 206 includes a processing unit 262 for executing software programs and services, a memory 264 for storing software and data, network ports 266 for transmitting and receiving data over a network, and an encryption processor 260 for performing functions related to Secure Sockets Layer processing of data transmitted and received over the network. In some embodiments, the central processing unit 262 may perform the functions of the encryption processor 260 in a single processor. Additionally, the hardware layer 206 may comprise multiple processors for each of the processing unit 262 and the encryption processor 260. The processor 262 may include any of the processors 101 described above in connection with FIGS. 1C and 1D. In some embodiments, the central processing unit 262 may perform the functions of the encryption processor 260 in a single processor. Additionally, the hardware layer 206 may comprise multiple processors for each of the processing unit 262 and the encryption processor 260. For example, in one embodiment, the appliance 200 comprises a first processor 262 and a second processor 262'. In other embodiments, the processor 262 or 262' comprises a multi-core processor.

Although the hardware layer 206 of appliance 200 is generally illustrated with an encryption processor 260, processor 260 may be a processor for performing functions related to any encryption protocol, such as the Secure Socket Layer (SSL) or Transport Layer Security (TLS) protocol. In some embodiments, the processor 260 may be a general purpose processor (GPP), and in further embodiments, may be have executable instructions for performing processing of any security related protocol.

Although the hardware layer 206 of appliance 200 is illustrated with certain elements in FIG. 2, the hardware portions or components of appliance 200 may comprise any type and form of elements, hardware or software, of a computing device, such as the computing device 100 illustrated and discussed herein in conjunction with FIGS. 1C and 1D. In some embodiments, the appliance 200 may comprise a server, gateway, router, switch, bridge or other type of computing or network device, and have any hardware and/or software elements associated therewith.

The operating system of appliance 200 allocates, manages, or otherwise segregates the available system memory into kernel space 204 and user space 204. In example software architecture 200, the operating system may be any type and/or form of Unix operating system although the invention is not so limited. As such, the appliance 200 can be running any operating system such as any of the versions of the Microsoft® Windows operating systems, the different releases of the Unix and Linux operating systems, any version of the Mac OS® for Macintosh computers, any embedded operating system, any network operating system, any realtime operating system, any open source operating system, any proprietary operating system, any operating systems for mobile computing devices or network devices, or any other operating system capable of running on the appliance 200 and performing the operations described herein.

The kernel space 204 is reserved for running the kernel 230, including any device drivers, kernel extensions or other kernel related software. As known to those skilled in the art, the kernel 230 is the core of the operating system, and provides access, control, and management of resources and hardware-related elements of the application 104. In accordance with an embodiment of the appliance 200, the kernel space 204 also includes a number of network services or processes working in conjunction with a cache manager 232, sometimes also referred to as the integrated cache, the benefits of which are described in detail further herein. Additionally, the embodiment of the kernel 230 will depend on the embodiment of the operating system installed, configured, or otherwise used by the device 200.

In one embodiment, the device 200 comprises one network stack 267, such as a TCP/IP based stack, for communicating with the client 102 and/or the server 106. In one embodiment, the network stack 267 is used to communicate with a first network, such as network 108, and a second network 110. In some embodiments, the device 200 terminates a first transport layer connection, such as a TCP connection of a client 102, and establishes a second transport layer connection to a server 106 for use by the client 102, e.g., the second transport layer connection is terminated at the appliance 200 and the server 106. The first and second transport layer connections may be established via a single network stack 267. In other embodiments, the device 200 may comprise multiple network stacks, for example 267 and 267', and the first transport layer connection may be established or terminated at one network stack 267, and the second transport layer connection on the second network stack 267'. For example, one network stack may be for receiving and transmitting network packet on a first network, and another network stack for receiving and transmitting network packets on a second network. In one embodiment, the network stack 267 comprises a buffer 243 for queuing one or more network packets for transmission by the appliance 200.

As shown in FIG. 2, the kernel space 204 includes the cache manager 232, a high-speed layer 2-7 integrated packet engine 240, an encryption engine 234, a policy engine 236 and multi-protocol compression logic 238. Running these components or processes 232, 240, 234, 236 and 238 in kernel space 204 or kernel mode instead of the user space 202 improves the performance of each of these components, alone and in combination. Kernel operation means that these components or processes 232, 240, 234, 236 and 238 run in the core address space of the operating system of the device 200. For example, running the encryption engine 234 in kernel mode improves encryption performance by moving encryption and decryption operations to the kernel, thereby reducing the number of transitions between the memory space or a kernel thread in kernel mode and the memory space or a thread in user mode. For example, data obtained in kernel mode may not need to be passed or copied to a process or thread running in user mode, such as from a kernel level data structure to a user level data structure. In another aspect, the number of context switches between kernel mode and user mode are also reduced. Additionally, synchronization of and communications between any of the components or processes 232, 240, 235, 236 and 238 can be performed more efficiently in the kernel space 204.

In some embodiments, any portion of the components 232, 240, 234, 236 and 238 may run or operate in the kernel space 204, while other portions of these components 232, 240, 234, 236 and 238 may run or operate in user space 202. In one embodiment, the appliance 200 uses a kernel-level data structure providing access to any portion of one or more network packets, for example, a network packet comprising a request from a client 102 or a response from a server 106. In some embodiments, the kernel-level data structure may be obtained by the packet engine 240 via a transport layer driver interface or filter to the network stack 267. The kernel-level data structure may comprise any interface and/or data accessible via the kernel space 204 related to the network stack 267, network traffic or packets received or transmitted by the network stack 267. In other embodiments, the kernel-level data structure may be used by any of the components or processes 232, 240, 234, 236 and 238 to perform the desired operation of the component or process. In one embodiment, a component 232, 240, 234, 236 and 238 is running in kernel mode 204 when using the kernel-level data structure, while in another embodiment, the component 232, 240, 234, 236 and 238 is running in user mode when using the kernel-level data structure. In some embodiments, the kernel-level data structure may be copied or passed to a second kernel-level data structure, or any desired user-level data structure.

The cache manager 232 may comprise software, hardware or any combination of software and hardware to provide cache access, control and management of any type and form of content, such as objects or dynamically generated objects served by the originating servers 106. The data, objects or content processed and stored by the cache manager 232 may comprise data in any format, such as a markup language, or communicated via any protocol. In some embodiments, the cache manager 232 duplicates original data stored elsewhere or data previously computed, generated or transmitted, in which the original data may require longer access time to fetch, compute or otherwise obtain relative to reading a cache memory element. Once the data is stored in the cache memory element, future use can be made by accessing the cached copy rather than refetching or recomputing the original data, thereby reducing the access time. In some embodiments, the cache memory element nat comprise a data object in memory 264 of device 200. In other embodiments, the cache memory element may comprise memory having a faster access time than memory 264. In another embodiment, the cache memory element may comprise any type and form of storage element of the device 200, such as a portion of a hard disk. In some embodiments, the processing unit 262 may provide cache memory for use by the cache manager 232. In yet further embodiments, the cache manager 232 may use any portion and combination of memory, storage, or the processing unit for caching data, objects, and other content.

Furthermore, the cache manager 232 includes any logic, functions, rules, or operations to perform any embodiments of the techniques of the appliance 200 described herein. For example, the cache manager 232 includes logic or functionality to invalidate objects based on the expiration of an invalidation time period or upon receipt of an invalidation command from a client 102 or server 106. In some embodiments, the cache manager 232 may operate as a program, service, process or task executing in the kernel space 204, and in other embodiments, in the user space 202. In one embodiment, a first portion of the cache manager 232 executes in the user space 202 while a second portion executes in the kernel space 204. In some embodiments, the cache manager 232 can comprise any type of general purpose processor (GPP), or any other type of integrated circuit, such as a Field Programmable Gate Array (FPGA), Programmable Logic Device (PLD), or Application Specific Integrated Circuit (ASIC).

The policy engine 236 may include, for example, an intelligent statistical engine or other programmable application (s). In one embodiment, the policy engine 236 provides a configuration mechanism to allow a user to identifying, specify, define or configure a caching policy. Policy engine 236, in some embodiments, also has access to memory to support data structures such as lookup tables or hash tables to enable user-selected caching policy decisions. In other embodiments, the policy engine 236 may comprise any logic, rules, functions or operations to determine and provide access, control and management of objects, data or content being cached by the appliance 200 in addition to access, control and management of security, network traffic, network access, compression or any other function or operation performed by the appliance 200. Further examples of specific caching policies are further described herein.

The encryption engine 234 comprises any logic, business rules, functions or operations for handling the processing of any security related protocol, such as SSL or TLS, or any function related thereto. For example, the encryption engine 234 encrypts and decrypts network packets, or any portion thereof, communicated via the appliance 200. The encryption engine 234 may also setup or establish SSL or TLS connections on behalf of the client 102a-102n, server 106a-106n, or appliance 200. As such, the encryption engine 234 provides offloading and acceleration of SSL processing. In one embodiment, the encryption engine 234 uses a tunneling protocol to provide a virtual private network between a client 102a-102n and a server 106a-106n. In some embodiments, the encryption engine 234 is in communication with the Encryption processor 260. In other embodiments, the encryption engine 234 comprises executable instructions running on the Encryption processor 260.

The multi-protocol compression engine 238 comprises any logic, business rules, function or operations for compressing one or more protocols of a network packet, such as any of the protocols used by the network stack 267 of the device 200. In one embodiment, multi-protocol compression engine 238 compresses bi-directionally between clients 102a-102n and servers 106a-106n any TCP/IP based protocol, including Messaging Application Programming Interface (MAPI) (email), File Transfer Protocol (FTP), HyperText Transfer Protocol (HTTP), Common Internet File System (CIFS) protocol (file transfer), Independent Computing Architecture (ICA) protocol, Remote Desktop Protocol (RDP), Wireless Application Protocol (WAP), Mobile IP protocol, and Voice Over IP (VoIP) protocol. In other embodiments, multi-protocol compression engine 238 provides compression of Hypertext Markup Language (HTML) based protocols and in some embodiments, provides compression of any markup languages, such as the Extensible Markup Language (XML). In one embodiment, the multi-protocol compression engine 238 provides compression of any high-performance protocol, such as any protocol designed for appliance 200 to appliance 200 communications. In another embodiment, the multi-protocol compression engine 238 compresses any payload of or any communication using a modified transport control protocol, such as Transaction TCP (T/TCP), TCP with selection acknowledgements (TCP-SACK), TCP with large windows (TCP-LW), a congestion prediction protocol such as the TCP-Vegas protocol, and a TCP spoofing protocol.

As such, the multi-protocol compression engine 238 accelerates performance for users accessing applications via desktop clients, e.g., Microsoft Outlook and non-Web thin clients, such as any client launched by popular enterprise applications like Oracle, SAP and Siebel, and even mobile clients, such as the Pocket PC. In some embodiments, the multi-protocol compression engine 238 by executing in the kernel mode 204 and integrating with packet processing engine 240 accessing the network stack 267 is able to compress any of the protocols carried by the TCP/IP protocol, such as any application layer protocol.

High speed layer 2-7 integrated packet engine 240, also generally referred to as a packet processing engine or packet engine, is responsible for managing the kernel-level processing of packets received and transmitted by appliance 200 via network ports 266. The high speed layer 2-7 integrated packet engine 240 may comprise a buffer for queuing one or more network packets during processing, such as for receipt of a network packet or transmission of a network packer. Additionally, the high speed layer 2-7 integrated packet engine 240 is in communication with one or more network stacks 267 to send and receive network packets via network ports 266. The high speed layer 2-7 integrated packet engine 240 works in conjunction with encryption engine 234, cache manager 232, policy engine 236 and multi-protocol compression logic 238. In particular, encryption engine 234 is configured to perform SSL processing of packets, policy engine 236 is configured to perform functions related to traffic management such as request-level content switching and request-level cache redirection, and multi-protocol compression logic 238 is configured to perform functions related to compression and decompression of data.

The high speed layer 2-7 integrated packet engine 240 includes a packet processing timer 242. In one embodiment, the packet processing timer 242 provides one or more time intervals to trigger the processing of incoming, i.e., received, or outgoing, i.e., transmitted, network packets. In some embodiments, the high speed layer 2-7 integrated packet engine 240 processes network packets responsive to the timer 242. The packet processing timer 242 provides any type and form of signal to the packet engine 240 to notify, trigger, or communicate a time related event, interval or occurrence. In many embodiments, the packet processing timer 242 operates in the order of milliseconds, such as for example 100 ms, 50 ms or 25 ms. For example, in some embodiments, the packet processing timer 242 provides time intervals or otherwise causes a network packet to be processed by the high speed layer 2-7 integrated packet engine 240 at a 10 ms time interval, while in other embodiments, at a 5 ms time interval, and still yet in further embodiments, as short as a 3, 2, or 1 ms time interval. The high speed layer 2-7 integrated packet engine 240 may be interfaced, integrated or in communication with the encryption engine 234, cache manager 232, policy engine 236 and multi-protocol compression engine 238 during operation. As such, any of the logic, functions, or operations of the encryption engine 234, cache manager 232, policy engine 236 and multi-protocol compression logic 238 may be performed responsive to the packet processing timer 242 and/or the packet engine 240. Therefore, any of the logic, functions, or operations of the encryption engine 234, cache manager 232, policy engine 236 and multi-protocol compression logic 238 may be performed at the granularity of time intervals provided via the packet processing timer 242, for example, at a time interval of less than or equal to 10 ms. For example, in one embodiment, the cache manager 232 may perform invalidation of any cached objects responsive to the high speed layer 2-7 integrated packet engine 240 and/or the packet processing timer 242. In another embodiment, the expiry or invalidation time of a cached object can be set to the same order of granularity as the time interval of the packet processing timer 242, such as at every 10 ms.

In contrast to kernel space 204, user space 202 is the memory area or portion of the operating system used by user mode applications or programs otherwise running in user mode. A user mode application may not access kernel space 204 directly and uses service calls in order to access kernel services. As shown in FIG. 2, user space 202 of appliance 200 includes a graphical user interface (GUI) 210, a command line interface (CLI) 212, shell services 214, health monitoring program 216, and daemon services 218. GUI 210 and CLI 212 provide a means by which a system administrator or other user can interact with and control the operation of appliance 200, such as via the operating system of the appliance 200 and either is user space 202 or kernel space 204. The GUI 210 may be any type and form of graphical user interface and may be presented via text, graphical or otherwise, by any type of program or application, such as a browser. The CLI 212 may be any type and form of command line or text-based interface, such as a command line provided by the operating system. For example, the CLI 212 may comprise a shell, which is a tool to enable users to interact with the operating system. In some embodiments, the CLI 212 may be provided via a bash, csh, tcsh, or ksh type shell. The shell services 214 comprises the programs, services, tasks, processes or executable instructions to support interaction with the appliance 200 or operating system by a user via the GUI 210 and/or CLI 212.

Health monitoring program 216 is used to monitor, check, report and ensure that network systems are functioning properly and that users are receiving requested content over a network. Health monitoring program 216 comprises one or more programs, services, tasks, processes or executable instructions to provide logic, rules, functions or operations for monitoring any activity of the appliance 200. In some embodiments, the health monitoring program 216 intercepts and inspects any network traffic passed via the appliance 200. In other embodiments, the health monitoring program 216 interfaces by any suitable means and/or mechanisms with one or more of the following: the encryption engine 234, cache manager 232, policy engine 236, multi-protocol compression logic 238, packet engine 240, daemon services 218, and shell services 214. As such, the health monitoring program 216 may call any application programming interface (API) to determine a state, status, or health of any portion of the appliance 200. For example, the health monitoring program 216 may ping or send a status inquiry on a periodic basis to check if a program, process, service or task is active and currently running In another example, the health monitoring program 216 may check any status, error or history logs provided by any program, process, service or task to determine any condition, status or error with any portion of the appliance 200.

Daemon services 218 are programs that run continuously or in the background and handle periodic service requests received by appliance 200. In some embodiments, a daemon service may forward the requests to other programs or processes, such as another daemon service 218 as appropriate. As known to those skilled in the art, a daemon service 218 may run unattended to perform continuous or periodic system wide functions, such as network control, or to perform any desired task. In some embodiments, one or more daemon services 218 run in the user space 202, while in other embodiments, one or more daemon services 218 run in the kernel space.

Figure 2B:
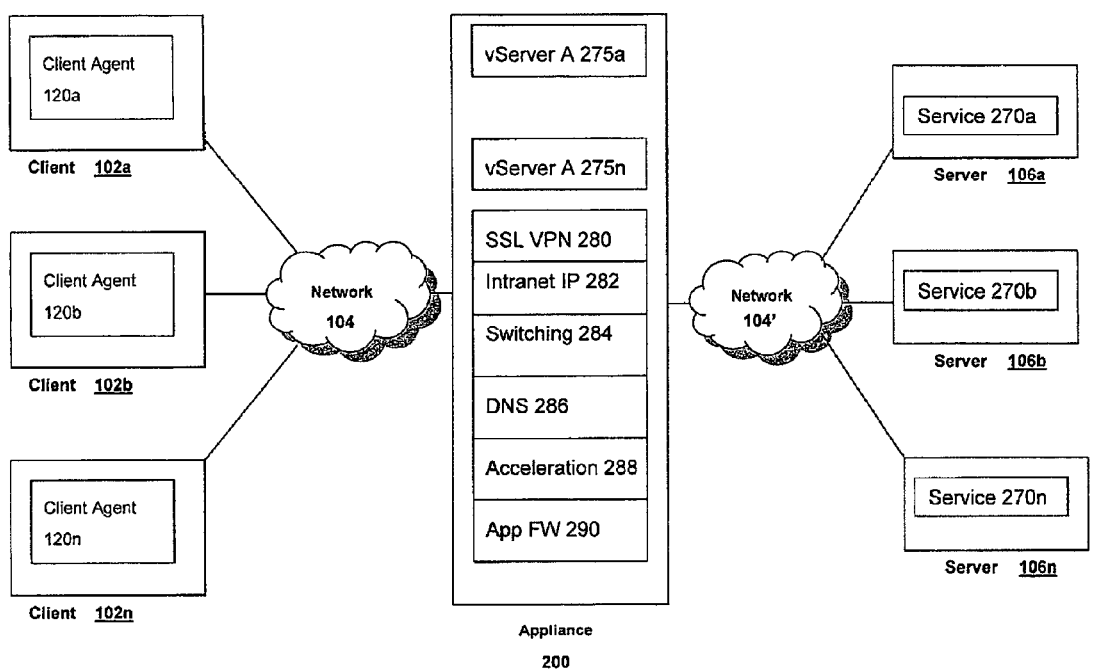
FIG. 2B is a block diagram of another embodiment of an appliance for optimizing, accelerating, load-balancing and routing communications between a client and a server.

Referring now to FIG. 2B, another embodiment of the appliance 200 is depicted. In brief overview, the appliance 200 provides one or more of the following services, functionality or operations: SSL VPN connectivity 280, switching/load balancing 284, Domain Name Service resolution 286, acceleration 288 and an application firewall 290 for communications between one or more clients 102 and one or more servers 106. In one embodiment, the appliance 200 comprises any of the network devices manufactured by Citrix Systems, Inc. of Ft. Lauderdale Fla., referred to as Citrix NetScaler devices. Each of the servers 106 may provide one or more network related services 270a-270n (referred to as services 270). For example, a server 106 may provide an http service 270. The appliance 200 comprises one or more virtual servers or virtual internet protocol servers, referred to as a vServer, VIP server, or just VIP 275a-275n (also referred herein as vServer 275). The vServer 275 receives, intercepts or otherwise processes communications between a client 102 and a server 106 in accordance with the configuration and operations of the appliance 200.

The vServer 275 may comprise software, hardware or any combination of software and hardware. The vServer 275 may comprise any type and form of program, service, task, process or executable instructions operating in user mode 202, kernel mode 204 or any combination thereof in the appliance 200. The vServer 275 includes any logic, functions, rules, or operations to perform any embodiments of the techniques described herein, such as SSL VPN 280, switching/load balancing 284, Domain Name Service resolution 286, acceleration 288 and an application firewall 290. In some embodiments, the vServer 275 establishes a connection to a service 270 of a server 106. The service 275 may comprise any program, application, process, task or set of executable instructions capable of connecting to and communicating to the appliance 200, client 102 or vServer 275. For example, the service 275 may comprise a web server, http server, ftp, email or database server. In some embodiments, the service 270 is a daemon process or network driver for listening, receiving and/or sending communications for an application, such as email, database or an enterprise application. In some embodiments, the service 270 may communicate on a specific IP address, or IP address and port.

In some embodiments, the vServer 275 applies one or more policies of the policy engine 236 to network communications between the client 102 and server 106. In one embodiment, the policies are associated with a VServer 275. In another embodiment, the policies are based on a user, or a group of users. In yet another embodiment, a policy is global and applies to one or more vServers 275a-275n, and any user or group of users communicating via the appliance 200. In some embodiments, the policies of the policy engine have conditions upon which the policy is applied based on any content of the communication, such as internet protocol address, port, protocol type, header or fields in a packet, or the context of the communication, such as user, group of the user, vServer 275, transport layer connection, and/or identification or attributes of the client 102 or server 106.

In other embodiments, the appliance 200 communicates or interfaces with the policy engine 236 to determine authentication and/or authorization of a remote user or a remote client 102 to access the computing environment 15, application, and/or data file from a server 106. In another embodiment, the appliance 200 communicates or interfaces with the policy engine 236 to determine authentication and/or authorization of a remote user or a remote client 102 to have the application delivery system 190 deliver one or more of the computing environment 15, application, and/or data file. In yet another embodiment, the appliance 200 establishes a VPN or SSL VPN connection based on the policy engine's 236 authentication and/or authorization of a remote user or a remote client 103 In one embodiment, the appliance 102 controls the flow of network traffic and communication sessions based on policies of the policy engine 236. For example, the appliance 200 may control the access to a computing environment 15, application or data file based on the policy engine 236.

In some embodiments, the vServer 275 establishes a transport layer connection, such as a TCP or UDP connection with a client 102 via the client agent 120. In one embodiment, the vServer 275 listens for and receives communications from the client 102. In other embodiments, the vServer 275 establishes a transport layer connection, such as a TCP or UDP connection with a client server 106. In one embodiment, the vServer 275 establishes the transport layer connection to an internet protocol address and port of a server 270 running on the server 106. In another embodiment, the vServer 275 associates a first transport layer connection to a client 102 with a second transport layer connection to the server 106. In some embodiments, a vServer 275 establishes a pool of transport layer connections to a server 106 and multiplexes client requests via the pooled transport layer connections.

In some embodiments, the appliance 200 provides a SSL VPN connection 280 between a client 102 and a server 106. For example, a client 102 on a first network 102 requests to establish a connection to a server 106 on a second network 104'. In some embodiments, the second network 104' is not routable from the first network 104. In other embodiments, the client 102 is on a public network 104 and the server 106 is on a private network 104', such as a corporate network. In one embodiment, the client agent 120 intercepts communications of the client 102 on the first network 104, encrypts the communications, and transmits the communications via a first transport layer connection to the appliance 200. The appliance 200 associates the first transport layer connection on the first network 104 to a second transport layer connection to the server 106 on the second network 104. The appliance 200 receives the intercepted communication from the client agent 120, decrypts the communications, and transmits the communication to the server 106 on the second network 104 via the second transport layer connection. The second transport layer connection may be a pooled transport layer connection. As such, the appliance 200 provides an end-to-end secure transport layer connection for the client 102 between the two networks 104, 104'.

In one embodiment, the appliance 200 hosts an intranet internet protocol or intranetIP 282 address of the client 102 on the virtual private network 104. The client 102 has a local network identifier, such as an internet protocol (IP) address and/or host name on the first network 104. When connected to the second network 104' via the appliance 200, the appliance 200 establishes, assigns or otherwise provides an IntranetIP, which is a network identifier, such as IP address and/or host name, for the client 102 on the second network 104'. The appliance 200 listens for and receives on the second or private network 104' for any communications directed towards the client 102 using the client's established IntranetIP 282. In one embodiment, the appliance 200 acts as or on behalf of the client 102 on the second private network 104. For example, in another embodiment, a vServer 275 listens for and responds to communications to the IntranetIP 282 of the client 102. In some embodiments, if a computing device 100 on the second network 104' transmits a request, the appliance 200 processes the request as if it were the client 102. For example, the appliance 200 may respond to a ping to the client's IntranetIP 282. In another example, the appliance may establish a connection, such as a TCP or UDP connection, with computing device 100 on the second network 104 requesting a connection with the client's IntranetIP 282.

In some embodiments, the appliance 200 provides one or more of the following acceleration techniques 288 to communications between the client 102 and server 106: 1) compression; 2) decompression; 3) Transmission Control Protocol pooling; 4) Transmission Control Protocol multiplexing; 5) Transmission Control Protocol buffering; and 6) caching. In one embodiment, the appliance 200 relieves servers 106 of much of the processing load caused by repeatedly opening and closing transport layers connections to clients 102 by opening one or more transport layer connections with each server 106 and maintaining these connections to allow repeated data accesses by clients via the Internet. This technique is referred to herein as "connection pooling".

In some embodiments, in order to seamlessly splice communications from a client 102 to a server 106 via a pooled transport layer connection, the appliance 200 translates or multiplexes communications by modifying sequence number and acknowledgment numbers at the transport layer protocol level. This is referred to as "connection multiplexing". In some embodiments, no application layer protocol interaction is required. For example, in the case of an in-bound packet (that is, a packet received from a client 102), the source network address of the packet is changed to that of an output port of appliance 200, and the destination network address is changed to that of the intended server. In the case of an outbound packet (that is, one received from a server 106), the source network address is changed from that of the server 106 to that of an output port of appliance 200 and the destination address is changed from that of appliance 200 to that of the requesting client 102. The sequence numbers and acknowledgment numbers of the packet are also translated to sequence numbers and acknowledgement expected by the client 102 on the appliance's 200 transport layer connection to the client 102. In some embodiments, the packet checksum of the transport layer protocol is recalculated to account for these translations.

In another embodiment, the appliance 200 provides switching or load-balancing functionality 284 for communications between the client 102 and server 106. In some embodiments, the appliance 200 distributes traffic and directs client requests to a server 106 based on layer 4 or application-layer request data. In one embodiment, although the network layer or layer 2 of the network packet identifies a destination server 106, the appliance 200 determines the server 106 to distribute the network packet by application information and data carried as payload of the transport layer packet. In one embodiment, the health monitoring programs 216 of the appliance 200 monitor the health of servers to determine the server 106 for which to distribute a client's request. In some embodiments, if the appliance 200 detects a server 106 is not available or has a load over a predetermined threshold, the appliance 200 can direct or distribute client requests to another server 106.

In some embodiments, the appliance 200 acts as a Domain Name Service (DNS) resolver or otherwise provides resolution of a DNS request from clients 102. In some embodiments, the appliance intercepts' a DNS request transmitted by the client 102. In one embodiment, the appliance 200 responds to a client's DNS request with an IP address of or hosted by the appliance 200. In this embodiment, the client 102 transmits network communication for the domain name to the appliance 200. In another embodiment, the appliance 200 responds to a client's DNS request with an IP address of or hosted by a second appliance 200'. In some embodiments, the appliance 200 responds to a client's DNS request with an IP address of a server 106 determined by the appliance 200.

In yet another embodiment, the appliance 200 provides application firewall functionality 290 for communications between the client 102 and server 106. In one embodiment, the policy engine 236 provides rules for detecting and blocking illegitimate requests. In some embodiments, the application firewall 290 protects against denial of service (DoS) attacks. In other embodiments, the appliance inspects the content of intercepted requests to identify and block application-based attacks. In some embodiments, the rules/policy engine 236 comprises one or more application firewall or security control policies for providing protections against various classes and types of web or Internet based vulnerabilities, such as one or more of the following: 1) buffer overflow, 2) CGI-BIN parameter manipulation, 3) form/hidden field manipulation, 4) forceful browsing, 5) cookie or session poisoning, 6) broken access control list (ACLs) or weak passwords, 7) cross-site scripting (XSS), 8) command injection, 9) SQL injection, 10) error triggering sensitive information leak, 11) insecure use of cryptography, 12) server misconfiguration, 13) back doors and debug options, 14) website defacement, 15) platform or operating systems vulnerabilities, and 16) zero-day exploits. In an embodiment, the application firewall 290 provides HTML form field protection in the form of inspecting or analyzing the network communication for one or more of the following: 1) required fields are returned, 2) no added field allowed, 3) read-only and hidden field enforcement, 4) drop-down list and radio button field conformance, and 5) form-field max-length enforcement. In some embodiments, the application firewall 290 ensures cookies are not modified. In other embodiments, the application firewall 290 protects against forceful browsing by enforcing legal URLs.

In still yet other embodiments, the application firewall 290 protects any confidential information contained in the network communication. The application firewall 290 may inspect or analyze any network communication in accordance with the rules or polices of the engine 236 to identify any confidential information in any field of the network packet. In some embodiments, the application firewall 290 identifies in the network communication one or more occurrences of a credit card number, password, social security number, name, patient code, contact information, and age. The encoded portion of the network communication may comprise these occurrences or the confidential information. Based on these occurrences, in one embodiment, the application firewall 290 may take a policy action on the network communication, such as prevent transmission of the network communication. In another embodiment, the application firewall 290 may rewrite, remove or otherwise mask such identified occurrence or confidential information.

C. Client Agent

Figure 3:
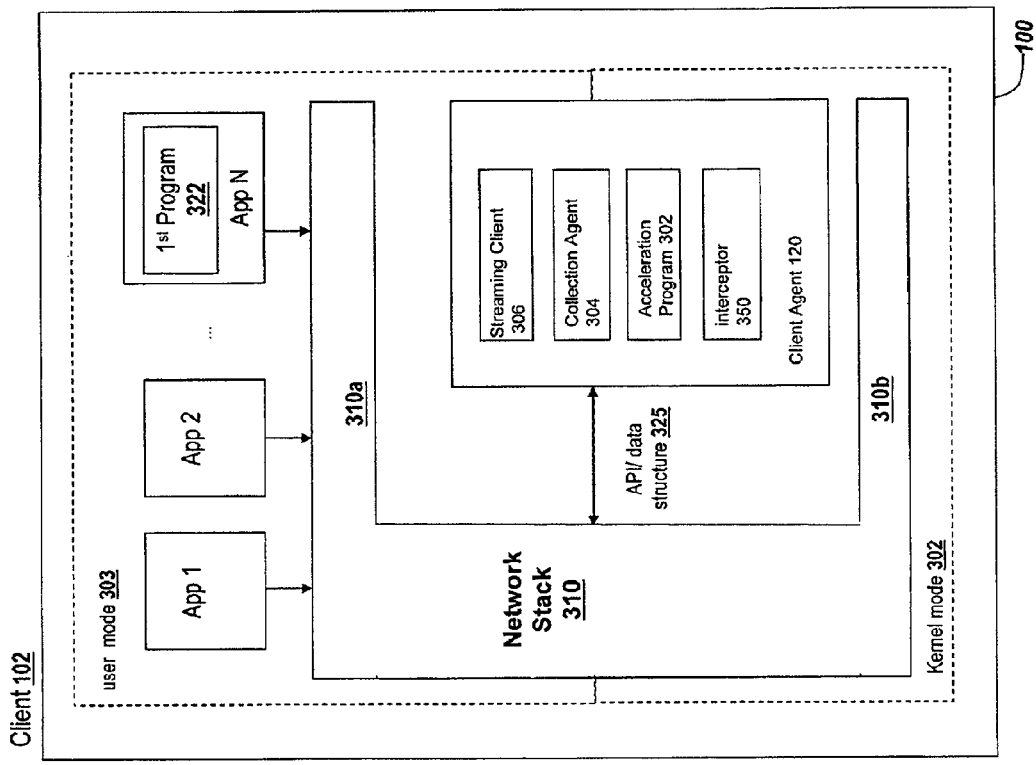
FIG. 3 is a block diagram of an embodiment of a client for communicating with a server via the appliance.

Referring now to FIG. 3, an embodiment of the client agent 120 is depicted. The client 102 includes a client agent 120 for establishing and exchanging communications with the appliance 200 and/or server 106 via a network 104. In brief overview, the client 102 operates on computing device 100 having an operating system with a kernel mode 302 and a user mode 303, and a network stack 310 with one or more layers 310a-310b. The client 102 may have installed and/or execute one or more applications. In some embodiments, one or more applications may communicate via the network stack 310 to a network 104. One of the applications, such as a web browser, may also include a first program 322. For example, the first program 322 may be used in some embodiments to install and/or execute the client agent 120, or any portion thereof. The client agent 120 includes an interception mechanism, or interceptor 350, for intercepting network communications from the network stack 310 from the one or more applications.

The network stack 310 of the client 102 may comprise any type and form of software, or hardware, or any combinations thereof, for providing connectivity to and communications with a network. In one embodiment, the network stack 310 comprises a software implementation for a network protocol suite. The network stack 310 may comprise one or more network layers, such as any networks layers of the Open Systems Interconnection (OSI) communications model as those skilled in the art recognize and appreciate. As such, the network stack 310 may comprise any type and form of protocols for any of the following layers of the OSI model: 1) physical link layer, 2) data link layer, 3) network layer, 4) transport layer, 5) session layer, 6) presentation layer, and 7) application layer. In one embodiment, the network stack 310 may comprise a transport control protocol (TCP) over the network layer protocol of the internet protocol (IP), generally referred to as TCP/IP. In some embodiments, the TCP/IP protocol may be carried over the Ethernet protocol, which may comprise any of the family of IEEE wide-area-network (WAN) or local-area-network (LAN) protocols, such as those protocols covered by the IEEE 802.3. In some embodiments, the network stack 310 comprises any type and form of a wireless protocol, such as IEEE 802.11 and/or mobile internet protocol.

In view of a TCP/IP based network, any TCP/IP based protocol may be used, including Messaging Application Programming Interface (MAPI) (email), File Transfer Protocol (FTP), HyperText Transfer Protocol (HTTP), Common Internet File System (CIFS) protocol (file transfer), Independent Computing Architecture (ICA) protocol, Remote Desktop Protocol (RDP), Wireless Application Protocol (WAP), Mobile IP protocol, and Voice Over IP (VoIP) protocol. In another embodiment, the network stack 310 comprises any type and form of transport control protocol, such as a modified transport control protocol, for example a Transaction TCP (T/TCP), TCP with selection acknowledgements (TCP-SACK), TCP with large windows (TCP-LW), a congestion prediction protocol such as the TCP-Vegas protocol, and a TCP spoofing protocol. In other embodiments, any type and form of user datagram protocol (UDP), such as UDP over IP, may be used by the network stack 310, such as for voice communications or real-time data communications.

Furthermore, the network stack 310 may include one or more network drivers supporting the one or more layers, such as a TCP driver or a network layer driver. The network drivers may be included as part of the operating system of the computing device 100 or as part of any network interface cards or other network access components of the computing device 100. In some embodiments, any of the network drivers of the network stack 310 may be customized, modified or adapted to provide a custom or modified portion of the network stack 310 in support of any of the techniques described herein. In other embodiments, the acceleration program 120 is designed and constructed to operate with or work in conjunction with the network stack 310 installed or otherwise provided by the operating system of the client 102.

The network stack 310 comprises any type and form of interfaces for receiving, obtaining, providing or otherwise accessing any information and data related to network communications of the client 102. In one embodiment, an interface to the network stack 310 comprises an application programming interface (API). The interface may also comprise any function call, hooking or filtering mechanism, event or call back mechanism, or any type of interfacing technique. The network stack 310 via the interface may receive or provide any type and form of data structure, such as an object, related to functionality or operation of the network stack 310. For example, the data structure may comprise information and data related to a network packet or one or more network packets. In some embodiments, the data structure comprises a portion of the network packet processed at a protocol layer of the network stack 310, such as a network packet of the transport layer. In some embodiments, the data structure 325 comprises a kernel-level data structure, while in other embodiments, the data structure 325 comprises a user-mode data structure. A kernel-level data structure may comprise a data structure obtained or related to a portion of the network stack 310 operating in kernel-mode 302, or a network driver or other software running in kernel-mode 302, or any data structure obtained or received by a service, process, task, thread or other executable instructions running or operating in kernel-mode of the operating system.

Additionally, some portions of the network stack 310 may execute or operate in kernel-mode 302, for example, the data link or network layer, while other portions execute or operate in user-mode 303, such as an application layer of the network stack 310. For example, a first portion 310a of the network stack may provide user-mode access to the network stack 310 to an application while a second portion 310a of the network stack 310 provides access to a network. In some embodiments, a first portion 310a of the network stack may comprise one or more upper layers of the network stack 310, such as any of layers 5-7. In other embodiments, a second portion 310b of the network stack 310 comprises one or more lower layers, such as any of layers 1-4. Each of the first portion 310a and second portion 310b of the network stack 310 may comprise any portion of the network stack 310, at any one or more network layers, in user-mode 203, kernel-mode, 202, or combinations thereof, or at any portion of a network layer or interface point to a network layer or any portion of or interface point to the user-mode 203 and kernel-mode 203.

The interceptor 350 may comprise software, hardware, or any combination of software and hardware. In one embodiment, the interceptor 350 intercept a network communication at any point in the network stack 310, and redirects or transmits the network communication to a destination desired, managed or controlled by the interceptor 350 or client agent 120. For example, the interceptor 350 may intercept a network communication of a network stack 310 of a first network and transmit the network communication to the appliance 200 for transmission on a second network 104. In some embodiments, the interceptor 350 comprises any type interceptor 350 comprises a driver, such as a network driver constructed and designed to interface and work with the network stack 310. In some embodiments, the client agent 120 and/or interceptor 350 operates at one or more layers of the network stack 310, such as at the transport layer. In one embodiment, the interceptor 350 comprises a filter driver, hooking mechanism, or any form and type of suitable network driver interface that interfaces to the transport layer of the network stack, such as via the transport driver interface (TDI). In some embodiments, the interceptor 350 interfaces to a first protocol layer, such as the transport layer and another protocol layer, such as any layer above the transport protocol layer, for example, an application protocol layer. In one embodiment, the interceptor 350 may comprise a driver complying with the Network Driver Interface Specification (NDIS), or a NDIS driver. In another embodiment, the interceptor 350 may comprise a mini-filter or a mini-port driver. In one embodiment, the interceptor 350, or portion thereof, operates in kernel-mode 202. In another embodiment, the interceptor 350, or portion thereof, operates in user-mode 203. In some embodiments, a portion of the interceptor 350 operates in kernel-mode 202 while another portion of the interceptor 350 operates in user-mode 203. In other embodiments, the client agent 120 operates in user-mode 203 but interfaces via the interceptor 350 to a kernel-mode driver, process, service, task or portion of the operating system, such as to obtain a kernel-level data structure 225. In further embodiments, the interceptor 350 is a user-mode application or program, such as application.

In one embodiment, the interceptor 350 intercepts any transport layer connection requests. In these embodiments, the interceptor 350 execute transport layer application programming interface (API) calls to set the destination information, such as destination IP address and/or port to a desired location for the location. In this manner, the interceptor 350 intercepts and redirects the transport layer connection to a IP address and port controlled or managed by the interceptor 350 or client agent 120. In one embodiment, the interceptor 350 sets the destination information for the connection to a local IP address and port of the client 102 on which the client agent 120 is listening. For example, the client agent 120 may comprise a proxy service listening on a local IP address and port for redirected transport layer communications. In some embodiments, the client agent 120 then communicates the redirected transport layer communication to the appliance 200.

In some embodiments, the interceptor 350 intercepts a Domain Name Service (DNS) request. In one embodiment, the client agent 120 and/or interceptor 350 resolves the DNS request. In another embodiment, the interceptor transmits the intercepted DNS request to the appliance 200 for DNS resolution. In one embodiment, the appliance 200 resolves the DNS request and communicates the DNS response to the client agent 120. In some embodiments, the appliance 200 resolves the DNS request via another appliance 200' or a DNS server 106.

In yet another embodiment, the client agent 120 may comprise two agents 120 and 120'. In one embodiment, a first agent 120 may comprise an interceptor 350 operating at the network layer of the network stack 310. In some embodiments, the first agent 120 intercepts network layer requests such as Internet Control Message Protocol (ICMP) requests (e.g., ping and traceroute). In other embodiments, the second agent 120' may operate at the transport layer and intercept transport layer communications. In some embodiments, the first agent 120 intercepts communications at one layer of the network stack 210 and interfaces with or communicates the intercepted communication to the second agent 120'.

The client agent 120 and/or interceptor 350 may operate at or interface with a protocol layer in a manner transparent to any other protocol layer of the network stack 310. For example, in one embodiment, the interceptor 350 operates or interfaces with the transport layer of the network stack 310 transparently to any protocol layer below the transport layer, such as the network layer, and any protocol layer above the transport layer, such as the session, presentation or application layer protocols. This allows the other protocol layers of the network stack 310 to operate as desired and without modification for using the interceptor 350. As such, the client agent 120 and/or interceptor 350 can interface with the transport layer to secure, optimize, accelerate, route or load-balance any communications provided via any protocol carried by the transport layer, such as any application layer protocol over TCP/IP.

Furthermore, the client agent 120 and/or interceptor may operate at or interface with the network stack 310 in a manner transparent to any application, a user of the client 102, and any other computing device, such as a server, in communications with the client 102. The client agent 120 and/or interceptor 350 may be installed and/or executed on the client 102 in a manner without modification of an application. In some embodiments, the user of the client 102 or a computing device in communications with the client 102 are not aware of the existence, execution or operation of the client agent 120 and/or interceptor 350. As such, in some embodiments, the client agent 120 and/or interceptor 350 is installed, executed, and/or operated transparently to an application, user of the client 102, another computing device, such as a server, or any of the protocol layers above and/or below the protocol layer interfaced to by the interceptor 350.

The client agent 120 includes an acceleration program 302, a streaming client 306, and/or a collection agent 304. In one embodiment, the client agent 120 comprises an Independent Computing Architecture (ICA) client, or any portion thereof, developed by Citrix Systems, Inc. of Fort Lauderdale, Fla., and is also referred to as an ICA client. In some embodiments, the client 102 comprises an application streaming client 306 for streaming an application from a server 106 to a client 102. In some embodiments, the client agent 120 comprises an acceleration program 302 for accelerating communications between client 102 and server 106. In another embodiment, the client agent 120 includes a collection agent 304 for performing end-point detection/scanning and collecting end-point information for the appliance 200 and/or server 106.

In some embodiments, the acceleration program 302 comprises a client-side acceleration program for performing one or more acceleration techniques to accelerate, enhance or otherwise improve a client's communications with and/or access to a server 106, such as accessing an application provided by a server 106. The logic, functions, and/or operations of the executable instructions of the acceleration program 302 may perform one or more of the following acceleration techniques: 1) multi-protocol compression, 2) transport control protocol pooling, 3) transport control protocol multiplexing, 4) transport control protocol buffering, and 5) caching via a cache manager. Additionally, the acceleration program 302 may perform encryption and/or decryption of any communications received and/or transmitted by the client 102. In some embodiments, the acceleration program 302 performs one or more of the acceleration techniques in an integrated manner or fashion. Additionally, the acceleration program 302 can perform compression on any of the protocols, or multiple-protocols, carried as a payload of a network packet of the transport layer protocol.

The streaming client 306 comprises an application, program, process, service, task or executable instructions for receiving and executing a streamed application from a server 106. A server 106 may stream one or more application data files to the streaming client 306 for playing, executing or otherwise causing to be executed the application on the client 102. In some embodiments, the server 106 transmits a set of compressed or packaged application data files to the streaming client 306. In some embodiments, the plurality of application files are compressed and stored on a file server within an archive file such as a CAB, ZIP, SIT, TAR, JAR or other archive. In one embodiment, the server 106 decompresses, unpackages or unarchives the application files and transmits the files to the client 102. In another embodiment, the client 102 decompresses, unpackages or unarchives the application files. The streaming client 306 dynamically installs the application, or portion thereof, and executes the application. In one embodiment, the streaming client 306 may be an executable program. In some embodiments, the streaming client 306 may be able to launch another executable program.

The collection agent 304 comprises an application, program, process, service, task or executable instructions for identifying, obtaining and/or collecting information about the client 102. In some embodiments, the appliance 200 transmits the collection agent 304 to the client 102 or client agent 120. The collection agent 304 may be configured according to one or more policies of the policy engine 236 of the appliance. In other embodiments, the collection agent 304 transmits collected information on the client 102 to the appliance 200. In one embodiment, the policy engine 236 of the appliance 200 uses the collected information to determine and provide access, authentication and authorization control of the client's connection to a network 104.

In one embodiment, the collection agent 304 comprises an end-point detection and scanning mechanism, which identifies and determines one or more attributes or characteristics of the client. For example, the collection agent 304 may identify and determine any one or more of the following client-side attributes: 1) the operating system an/or a version of an operating system, 2) a service pack of the operating system, 3) a running service, 4) a running process, and 5) a file. The collection agent 304 may also identify and determine the presence or versions of any one or more of the following on the client: 1) antivirus software, 2) personal firewall software, 3) anti-spam software, and 4) internet security software. The policy engine 236 may have one or more policies based on any one or more of the attributes or characteristics of the client or client-side attributes.

In some embodiments and still referring to FIG. 3, a first program 322 may be used to install and/or execute the client agent 120, or portion thereof, such as the interceptor 350, automatically, silently, transparently, or otherwise. In one embodiment, the first program 322 comprises a plugin component, such an ActiveX control or Java control or script that is loaded into and executed by an application. For example, the first program comprises an ActiveX control loaded and run by a web browser application, such as in the memory space or context of the application. In another embodiment, the first program 322 comprises a set of executable instructions loaded into and run by the application, such as a browser. In one embodiment, the first program 322 comprises a designed and constructed program to install the client agent 120. In some embodiments, the first program 322 obtains, downloads, or receives the client agent 120 via the network from another computing device. In another embodiment, the first program 322 is an installer program or a plug and play manager for installing programs, such as network drivers, on the operating system of the client 102.

D. Server Initiated Connections to a SSL VPN Client

Figure 4A:
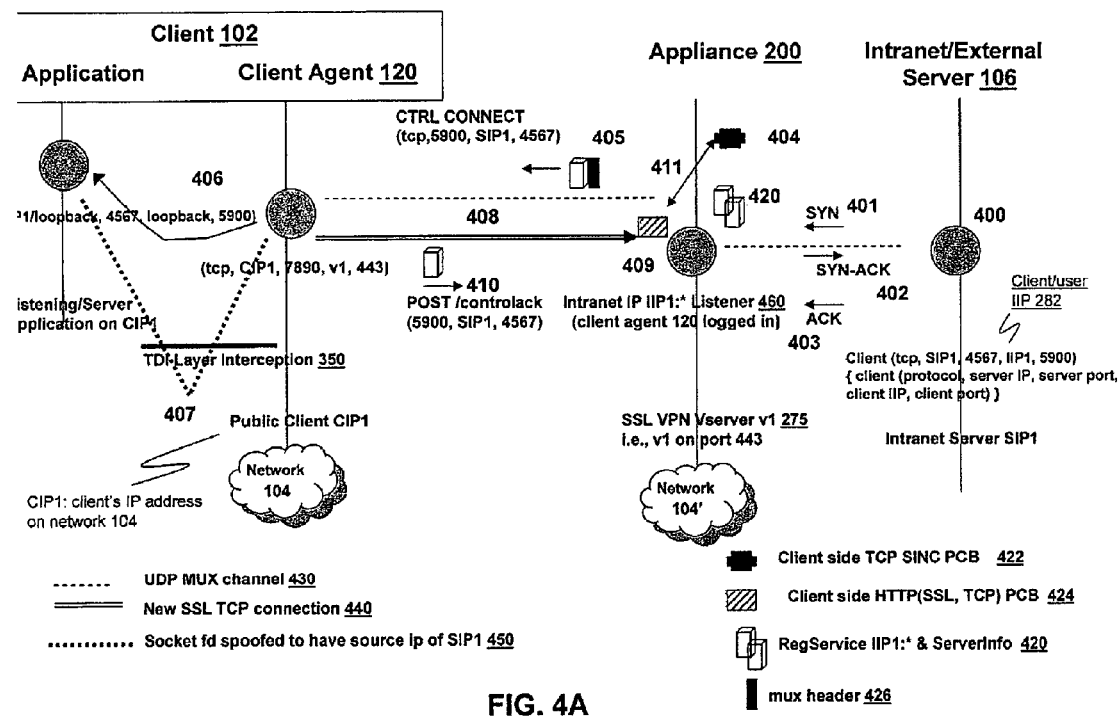
FIG. 4A is a block diagram of an embodiment of an appliance providing a server initiated connection to a virtual private network connected client.

Referring now to FIG. 4A, an embodiment of an appliance 200 and client agent 120 is depicted for providing a server initiated transport layer connection between a server 106 and a client 102 connected by a virtual private network connection via the appliance 200. In brief overview, a client 102 on a first network 104 may establish a virtual private network connection, such as a SSL VPN connection, via the appliance 200 to a second network 104'. The appliance 200 assigns an Intranet Internet Protocol (IIP) address 282 to the client 102 or the user of the client 102. A server 106 initiates a transport layer connection with the client 102 using the IIP address 282. The appliance 200 intercepts the transport layer connection request and establishes a first transport layer connection with the server 106. The appliance 200 transmits information about the connection request to the client agent 120 of the client 102 via control connection or communication channel. With this information, the client agent 120 establishes a second and local transport layer connection with the application on the client 102. The client agent 120 also establishes a third transport layer connection, such as a SSL VPN connection, to the appliance 200, and associates the second and third transport layer connections. The appliance 200 associates the third transport layer connection with the first transport layer connection, and forwards any data from the server 106 to the client agent 120 to forward to the application. The client agent 120 receives the data via the third transport layer connection and forwards the data o the application via the second transport layer connection. The various details of the embodiment depicted in FIG. 4A will be described later in conjunction with FIG. 4B below.

A server 106 may initiate a transport layer connection to a client 102 using any kind of transport layer protocol. In one embodiment, the server 106 may initiate a TCP connection with the client 102. In another embodiment, the server 106 may initiate a UDP connection with the client 102. In some embodiments, the server 106 may reside on the private or intranet network 104' accessed via the appliance 200. In other embodiments, the server 106 may reside on an extranet, or network 104 external to the appliance 200 and/or client 102.

A server 106 may initiate a transport layer connection to a client 102 in different ways. The server 106 may initiate a 1) pure server initiated connection, 2) a client triggered initiated connection, or 3) a server initiated connection derived from information embedded in the payload, referred to as a hybrid connection. In one embodiment, a pure server initiated connection is when a server 106 has prior knowledge about the IIP address 282 and port of the SSL VPN client 102 and makes a connection to the client 102. This connection request is intercepted by the appliance 200. For example, a server 106 may access telnet or web-services running on a SSL VPN logged in client 102. In some embodiments, the SSL VPN client 102 triggers the server 106 to initiate the transport layer connection. For example, the SSL VPN client 102 makes an initial connection to the server 106 and the server 106 connects to the client 102 on a port that is well-known or is derived from the first port used by the client 102 to connect to the server 106.

In other embodiments, the server initiated connection is a hybrid. For example, the client 102 makes an initial connection to the server 106 and the client 102 and server 106 exchange ports and IP addresses with an application specific protocol. As such, in one embodiment, the IP address and port information is embedded or included in the payload of the transport layer packets. A NetMeeting data connection is an example of a hybrid server initiated connection as well as the port command used in an active file transfer protocol (FTP) session. In these embodiments, the appliance modifies the payload exchanged between the client 102 and server 106 to use the IIP address 282 of the client 102 or user of the client 102.

In some embodiments, the client agent 120 and appliance communicate via a control channel or control connection. The control channel may comprise a UDP or TCP transport layer connection. In one embodiment, the client agent 120 and appliance 200 establish a persistent connection for exchanging control messages. In some embodiments, this control connection is created by the client agent sending an HTTP GET request, or a /cs HTTP GET request to the appliance 200. In one embodiment, the appliance 200 handles SSL VPN connection requests via an HTTP handler. In another embodiment, the client agent 120 and appliance 200 can use this control connection to send periodic "heart-beat" or health check messages, such as when there is not network traffic.

In some embodiments, the appliance 200 and client agent 200 may exchange control messages via a control channel protocol. In one embodiment, the appliance 200 transmits control messages to the client agent 120 via a multiplex UDP channel using a UDP multiplexed header 426. In one embodiment, the appliance 200 transmits a udp multiplexed header 426 to inform the client agent 120 of a server initiated TCP or UDP request. By way of example only and in no way limiting the control channel protocol, the following udp multiplex header 426 is used:

```
typedef struct ns_udp_mul_head {
    u08bits ver;         // version
    u08bits typpro;      // 0xF0: Type, 0x0F: protocol
    u16bits len;         // Length of data
    u32bits sip;         // Network Order Server IP
    u32bits cip;         // Network Order Client IP
    u16bits sport;       // Network Order Server Port
    u16bits cport;       // Network Order Client Port
    u16bits ipid;        // IP ID when needed
    u16bits padding;     // Must be zero
} ns_udp_mul_head_t;
```

Although a control message protocol from the appliance 200 to the client agent 120 is generally described above with data elements of a certain type and size and for holding a certain value, the control message protocol may use any type and form of header or data structure of a wide variety of types and sizes to convey server initiated connection information and values to the client agent 120 in performing the operations described herein.

In one embodiment, the client agent 120 opens a connection to the application on the tuple <localhost, destport, typeproto>. The client agent 120 opens a new connection to the appliance 200 and links it to the application connection. In case of TCP, the 3-tuple sent by the appliance 200 is sent back as part of the new connection from the client agent 120. This allows the appliance 200 to find out which server initiated connection this belongs to. In response to a TCP server initiated connection request from the appliance 200, the client agent 120 opens a connection to the appliance 200, in one embodiment, by issuing a /controlack HTTP POST request. By way of example, the client agent 12-issues the following request:

```
POST /controlack HTTP/1.1\r\n
PROTOCOL: TCP\r\n
COOKIE: session=loginid\r\n
Content-Length:8\r\n
\r\n
<BODY will include
CLNTPORT :< destport received in control message>
CSPORT: <srcport received in control message>,
CSIP: <srcip received in control message>,
>
```

If the client agent 120 cannot open a connection to the application on localhost, the client agent 120 may indicate an error by re-sending the udp-multiplexed header 426 with len set to 0. In some embodiments, this header 426 includes the 3-tuple the client agent 120 received previously so that the appliance 200 can clean up the server side connection. In case of TCP, the appliance 200 may send a reset. In case of UDP, the appliance may send a port unreachable Internet Control Message Protocol (ICMP) error.

In some embodiments, the appliance 200, such as in the kernel, manages or handle UDP data via a client and server network address translation (nat) protocol control block (pcb) pair, or natpcb pair. In one embodiment, a process control blocks or pcbs 422, 422 may be used to store, track and maintain information regarding a socket or socket connection. For example, a PCB may store information and track a state of a socket connection. In some embodiments, a PCB comprises a record of information on a state or attributes of a connection, such as a connection record. A natpcb may store information and track a state or the network address translation of a socket connection traversing between a first network and a second network. The appliance 200 creates, tracks, updates and maintains, in a table, database, memory or other storage, client and server side PCBs 422, 424 and natpcbs in providing the operations described herein.

Although the state, information and connection management of various transport layer connections are generally described herein using a process control block (pcb), any type and form of connection record may be used to store, hold, maintain and track any information related to a connection, or socket thereof. A connection record may comprise any information stored in a data structure or object in memory. A connection record may comprise any storage element, such as a table, database or entries in a table or database. The appliance 200 may manage, organize and track one or more connection records in memory (data structure or object), or in storage (table or database).

For server-initiated connections, in one embodiment, the appliance creates the server natpcb 422 with the connection parameters transmitted from the server 106. The appliance 200 creates the client natpcb 422 with the tuple <localhost, destport, mip, mport>, and this may also be used in the multiplex header 426 as shown by way of example via the table below. The mip and mport are for Mapped IP embodiments, where the appliance maps the client IP address and port to an appliance provided IP address and port.

| Client 102 | Server 106 |
|---|---|
| GET /cs | |
| | HTTP/1.1 200 OK |
| ... | ... |
| | ns_udp_mul_head_t packet over control channel |
| POST /controlack HTTP/1.1 | |
| PRTCL: TCP | |
| COOKIE: session=loginid | |
| Content-Length:8 | |
| <2 bytes for CLNTPORT> | |
| <2 bytes for CSPORT> | |
| <4 bytes for CSIP> | |
| | HTTP/1.1 200 OK |

In one embodiment, the appliance 200 establishes a listener process 460 upon establishment of the connection 440 and/or upon login of the user. In some embodiments, the listener process comprises an application, program, service, thread, task or other set of executable instructions to listen for transport layer connection messages. In some embodiments, the listener 260 is a TCP or UDP socket based listener. In one embodiment, the appliance 200 hosts the IIP address 282 of the user or the client 102. In these embodiments, the appliance 200 provides the listener process 460 to act as, spoof or otherwise virtualize the client 102 as available on the network 104'. As such, in some embodiments, the appliance 200 via the listener 260 listens for any network communications transmitted to the IIP address 282 of the client 102. In one embodiment, the listener 460 registers itself and/or the IIP address with registration service or database 420. In one embodiment, the registration service 420 comprises a pcb, information about a pcb or association of pcbs. In other embodiments, the registration service 420 includes information about the server 106, such as any IP and port information of the server's connection with the application. In some embodiments, the registration service 420 associates the server 106 with the client's IIP address 282 it has initiated a connection to.

Figure 4B:
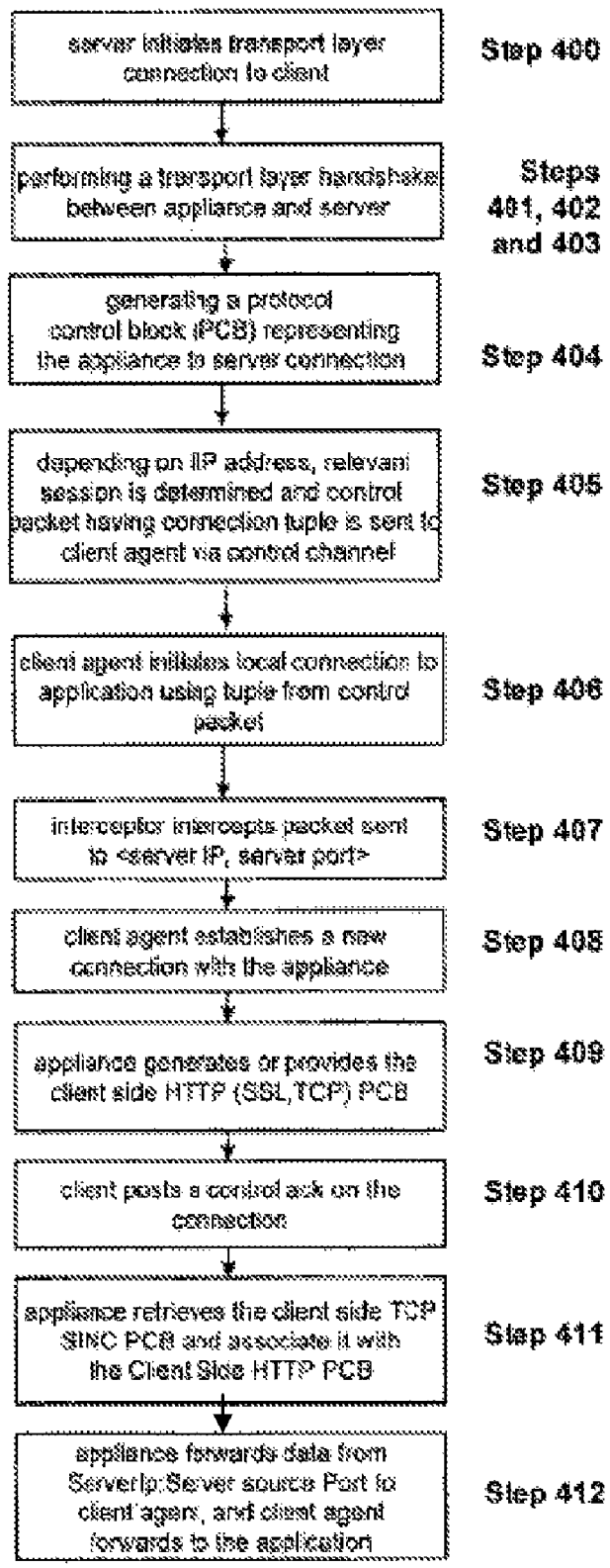
FIG. 4B is a flow diagram depicting steps of an embodiment of a method for practicing a technique for providing a server initiated connection to a virtual private network connected client.

Referring now to FIG. 4B, details of steps of an embodiment of a method for practicing server initiation connections with the appliance 200 and client agent 120 is depicted. FIG. 4B will be described and discussed in conjunction with FIG. 4A as the steps of method 450 are referenced in the diagram of FIG. 4A. In brief overview, at step 400, the server 106 initiated a transport layer connection to the client 102. At steps 401, 402 and 403, the appliance 200 and server 106 perform a transport layer connect handshake to establish a first transport layer connection. At step 404, the appliance 200 generates a protocol control block (pcb) 422 representing the appliance 200 to server 106 connection, e.g., the first transport layer connection. At step 405, the appliance 200 transmits a control packet to the client agent 120 via the control connection. The control packet may use the mux header 256 to identify the connection tuple. At step 406, the client agent 120 initiates a local connection, e.g., a second transport layer connection, with the application on the client 102 using the tuple from the control packet. At step 407, the client agent 120, via interceptor 350, intercepts packet sent to the server IP address and port. At step 408, the client agent 120 establishes a new transport layer connection, e.g., a third connection or SSL VPN connection, with the appliance 200. At step 409, the appliance 200 generates a client-side HTTP protocol control block 424. At step 410, the client transmits a control ack message via the established third connection. At step 411, the appliance 200 retrieves the client-side TCP SYNC protocol control block 422 and associates it the client-side HTTP protocol control block 424. At step 412, the appliance 200 forwards data received from the server, e.g., from server IP and server source port, via the first transport layer connection to the client agent 120 via the third transport layer connection and the client agent 120 provides the data to the application via the second transport layer connection.

In further details, at step 400, the server 106 initiates a transport layer connection to the client 102 via any one of a number of different ways and may use any type and form of transport layer protocol. In one embodiment, the server 106 initiates a TCP connection to the client 102. In another embodiment, the server 106 initiates a UDP connection to the client 102. In one embodiment, the server 106 makes a pure server initiated connection. In another embodiment, the server 106 makes a client triggered server initiated connection. In some embodiments, the server 106 makes a hybrid server initiated connection by which the client 102 and server 106 exchange connection information via an application layer protocol and payload. In one embodiment, the server 106 resides on the intranet of the appliance 200. In other embodiments, the server 106 may be external to the appliance 200, client 102 and networks 104 or 104'.

In some embodiments, the appliance 200 determines the number of server initiated connection requests to the client 102 exceeds a predetermined threshold or quantity. For example, the appliance 200 may be configured to only establish a maximum number of server initiated connections to any one client. This predetermined maximum may be configurable by a user, such as an administrator. In another example, the appliance 200 may be configured to only establish a maximum number of server initiated connections to any of the VPN connected clients. Upon determining the server initiated connection request exceeds the predetermined threshold, the appliance 200 does not establish the server requested connection. In one embodiment, the appliance 200 drops the request. In another embodiment, the appliance 200 denies the request. In yet another embodiment, the appliance 200 responds with an error to the server 106. In some embodiments, the appliance 200 responds to the server 106 with an indication the number of server initiated connections allowed has been exceeded. In yet other embodiments, the appliance 200 does not perform any of the remaining steps of method 450.

At steps 401, 402, and 403, the server 106 and appliance 200 perform a transport layer connection handshake. In one embodiment, the transport layer handshake comprises a TCP handshake. For example, at step 401, the server 106 transmits a TCP SYN packet. In response, at step 402, the appliance 200 transmits a TCP SYN-ACK packet 402. In response to the TCP SYN-ACK and to complete the handshake, the server 106 transmits a TCP ACK packet. In other embodiments, the method 450 is practiced without the handshake of steps 401, 402 and 403, such as in the case of UDP, which is a connectionless protocol. In other embodiments, a secure UDP connection may be used, in which a handshake of any of the steps of 401, 402 or 403 are performed, such as for an SSL or TLS UDP connection.

At step 404, the appliance generates, creates or otherwise provides a protocol control block (pcb) for the appliance to server connection. In one embodiment, the appliance 200 creates a client side pcb 422 upon successful establishment of the first transport layer connection between the appliance 200 and the server 102. In some embodiments, the pcb 422 is referred to as a client side TCP SYNC pcb as it represents the successful establishment of the handshake of steps 401 through 403. In these embodiments, the pcb 422 represents the state of the socket or socket connection of the first transport layer connection. From the perspective of the server 106, in one embodiment, it appears to the server 106 that it has established the transport layer connection with the client 102.

At step 405, the appliance 200 transmits a control message to the client agent 120 via a control connection or communication channel 430. In some embodiments, the control channel 430 comprises a UDP multiplexed channel. In other embodiments, the control channel 430 may comprise any type and form of connection, including a TCP connection, SSL VPN connection 440, or any other transport layer connection. In one embodiment, the appliance 200 and client agent 120 communicate via an HTTP connection. In some embodiments, the appliance 200 determines the client agent 120 to transmit the control message by the IIP address 282 of the client 102 used in the server initiated transport layer connection request. In one embodiment, the IIP address 282 is assigned by the appliance 200 to the user of the client 102. In another embodiment, the IIP address 282 is assigned to the client 102. The appliance 200 may track the IIP address 282 via a table, database mapping IIP addresses to clients 102 or users. In one embodiment, the appliance 200 may have a natpcb providing the IIP address mapping.

In one embodiment, the appliance 200 sends a message to the client agent 120 identifying information related to the server imitated connection request, including any of the protocol, the port number of the client, the IP address of the server 106, and the port of the server 106. In some embodiments, the appliance 200 transmits to the client 102 the client's IIP address 282. The appliance 200 may determine the relevant session and corresponding tuple information based on the IIP address 282. In some embodiments, the appliance 200 transmits a UDP multiplexed header 426 to the client agent 120 that comprises information identifying the following information: <server IP, server port, Client IP, client port>. In the case of a server initiated UDP transport layer connection request, the appliance 200 pre-pends the UDP multiplexed header 426 to a UDP datagram and transmits the UDP datagram to the client agent 120.

At step 406, the client agent 120 establishes a second transport layer connection with an application on the client 102. For example, the application may be the intended recipient or target of the server initiated connection request, such as NetMeeting, active FTP, a telnet session or web service. In one embodiment, the client agent 120 determines the type of protocol, for example, whether the server initiated connection request is TCP or UDP, from the header 486. In the case of TCP type protocol, the client agent 120 creates a new client-side protocol control block. In some embodiments, the client agent 120 initiates a local transport layer connection to the application using <server IP, server port, Client IP, client port>. In one embodiment, the client agent 120 makes a local loopback connection using the client port number identified by the control message and local IP address of the client 102.

At step 407, the client agent 120 intercepts one or more network packets transmitted by the application to the destination of <server IP (SIP), server port>. In some embodiments, the interception mechanism 350 of the client agent 120 intercepts the network packets. In one embodiment, the interception mechanism 350 comprises a Transport Driver Interface (TDI) layer interception mechanism to intercept transport layer network packets. In another embodiment, the client agent 120 or interception mechanism 350 intercepts network packets of the application seamlessly and/or transparently to the application or user of the application. In some embodiments, the client agent 120 intercepts the network packets transmitted via the second transport layer connection or local connection in order to transmit the network packets via third transport layer connection to the appliance 200. In one embodiment, the client agent 120 spoofs the local connection 450 to have a source IP address of the server 106.

At step 408, the client agent 120 establishes a transport layer connection, or third connection, 440 with the appliance 200. In some embodiments, the client agent 120 establishes a SSL VPN connection 440. In one embodiment, the client agent 120 and appliance 200 perform a SSL or TLS handshake to establish a secure session over the transport layer connection. In one embodiment, the client 102 establishes a transport layer connection with a vServer 275 of the appliance 200. As such, in some embodiments, the client agent 120 connects to the IP address and port number of the vServer 275. In other embodiments, the client agent 120 established a connection to the appliance 200 using the IP address of the client 102 on the first network 104 as the source IP address. In another embodiment, the client agent 120 uses a source port available on the client 102 to establish the transport layer connection with the appliance 200. In one embodiment, the client agent 120 associates the second transport layer connection, or local connection 450, with the third transport layer connection 440 to the appliance 200.

At step 409, the appliance 200 provided or obtains a protocol control block (pcb) 424 for the third transport layer connection 440 between the client agent 120 and appliance 200. In some embodiments, this pcb 424 is referred to as the client-side HTTP pcb 424 for the SSL over TCP connection 440. In one embodiment, the appliance generates the pcb 424. In other embodiments, the appliance 200 receives the pcb 424 from the client agent 120. In yet another embodiment, the pcb 424 comprises a pcb from a previous client-side SSL TCP connection of the client 102.

At step 410, the client agent 120 transmits a message to the appliance 200 via one of the control connection 430 or the newly established SSL TCP connection 440. In one embodiment, the client agent 120 transmits a control message providing the tuple information of client port, server IP address and server port that was provided in the control connect message of step 405. In another embodiment, the control ack message includes the following: <server IP, server port, Client IP, client-port>. In further embodiments, the control ack message may also identify the type of protocol. In some embodiments, the client agent 120 transmits a control acknowledgement process control block (pcb), referred to as ctrl_ack_pcb or control_ack_pcb, via the SSL TCP connection 440. The appliance 200 may respond to the control message of the client agent 120. For example, in one embodiment, the appliance 200 responds with a 200 OK response for the /controlack pcb.

At step 411, the appliance 200 associates the client-side TCP SYNC pcb 422 with the client-side HTTP pcb 424. In one embodiment, the appliance 200 retrieves or lookups up the TCP SYNC pcb 422 associated with the client 102 or IIP address 282 of the client or user of the client. In some embodiments, the appliance 200 maintains the association of the pcbs 422, 424 in a table, database, or other storage location. In another embodiment, the appliance 200 provides for the association of the pcbs 422, 424 in a data structure or object in memory. In yet another embodiment, the appliance 200 uses a pcb to track the association between the pcbs 422 and 424.

At step 412, upon establishment of the third transport layer connection 440, and the association of pcbs, the appliance forwards data from the server 106 received via the first transport layer connection to the client agent 120 via the third transport layer connection 440. In one embodiment, data from or associated with the client ctrlack_pcb 424 is intercepted by an appliance client handler and forwarded to the sinc_pcb 422. In some embodiments, the data associated or from sinc_pcb 422 is handled by the appliance 200 via a server-side or tcp handler and forwarded or sent on the ctrlack_pcb 424. In one embodiment, the appliance 200 establishes a listener process 460 upon establishment of the connection 440 and/or upon login of the user. In some embodiments, the listener process 460 listens for incoming data from the server 106 to forward to the client agent 120 or client 102. In one embodiment, the appliance 200 forwards data coming from the server's IP address and server source port to the client IP address and port number of the client agent 120 of the third transport layer connection 440. In another embodiment, the client agent 120 intercepts traffic from the application directed towards the IP address and port of the server, and forward the traffic to the appliance 200 to forward via the first transport layer connection.

In view of the steps of method 450 described above, in some embodiments of a hybrid type of server initiated connection, the appliance 200 may intercept and modify any of the network packets transmitted between the client 102 and server 106. As the connection information may be embedded in the payload of these network packets, the appliance 200 may read such information from the payload in practicing any of the steps of method 450 described above. Additionally, the appliance 200 may modify any of the network packets between the client agent 120 and the appliance 200 in order for the server initiated connection to operate at an application layer protocol level in accordance with the operations described herein. For example, the appliance 200 may modify any network packet to change the client IP address to the IIP address 282. In other examples, the appliance 200 may modify any network packets to map the connection information from the server to the third transport layer connection client agent 120, and vice-versa (from the client agent to the server).

In the case of errors in establishing or user of the server initiated connection, the appliance 200 and client agent 120 may communicate such events in order to clean up any of the plurality of connections and to free up resources. For example, in one embodiment, if the client agent 120 fails to connect to the application after receiving the Server Initiated Connection request, the client agent 120 sends an error packet or error control message to the appliance. The appliance 200 then closes the server side transport layer connection. In another embodiment, if the appliance to server connection is not alive when the client agent 120 posts its controls acknowledgement to the appliance 200, the appliance 200 sends an HTTP error response to the client agent 120, which then closes the second loop back TCP connection to the appliance, and the third transport layer connection to the appliance 200. The client agent 120 then in one embodiment cleans up the associated resources.

In some embodiments, if the client agent 120 cannot send data to the application, the client agent 120 closes the connection to the application and the connection to the appliance. In other embodiments, the client agent 120 logs any errors sending and receiving data, such as in the case of a UDP server initiated connection. In one embodiment, upon getting an error indication from the client agent 120, the appliance 200 resets the server connection if the protocol type or connection type is TCP, and in the embodiment of UDP, the appliance 200 sends a 'Port Unreachable' ICMP error message to the server. In yet another embodiment, then the server 106 closes the connection or an error occurs on the server side connection, the appliance 200 closes the corresponding client side connection.

In view of the structure, functions and operations of the appliance and client agent described above, systems and methods are provided for a flexible, efficient and transparent method of handling and managing server initiated connections to SSL VPN clients connected to a network via the appliance. As such, servers and SSL VPN clients can transparently communicate via connections established by either the server or the client. Although generally described above as a server initiated connection, any computing device, such as another client, connected to the network of the appliance may initiate a connection to an SSL VPN client. The SSL VPN clients seamlessly appear as clients on the network accessed or managed by the appliance. This enables SSL VPN users to take advantage of applications, such as collaboration tools, that use server initiated connections. Additionally, clients of SSL VPN users can provide access to applications and collaboration tools to the other clients and servers on the intranet of the appliance.

Many alterations and modifications may be made by those having ordinary skill in the art without departing from the spirit and scope of the invention. Therefore, it must be expressly understood that the illustrated embodiments have been shown only for the purposes of example and should not be taken as limiting the invention, which is defined by the following claims. These claims are to be read as including what they set forth literally and also those equivalent elements which are insubstantially different, even though not identical in other respects to what is shown and described in the above illustrations.

What is claimed:

1. A method comprising:
(a) receiving, by a device intermediary to a server operating on a first network and a plurality of clients, a transport layer connection request from the server to connect to a client, the client operating on a second network, the transport layer connection request identifying a destination internet protocol address and a destination port of the client on the first network;
(b) establishing, by the device, a first transport layer connection to the server on the first network;
(c) determining, by the device, an internet protocol address of the client on the second network corresponding to the destination internet protocol address of the client on the first network;
(d) establishing, by the device, a second transport layer connection with an agent on the client at the internet protocol address on the second network, the agent establishing a third transport layer connection to the identified destination port; and
(e) associating, by the device, a first connection record for the first transport layer connection with a second connection record for the second transport layer connection linked to the first transport layer connection.

2. The method of claim 1, wherein step (a) further comprises receiving, by the device, the transport layer connection request from the server responsive to initiating by the server to connect to the client.

3. The method of claim 1, wherein step (a) further comprises receiving, by the device, the transport layer connection request from the server responsive to the client triggering the server to initiate connection to the client.

4. The method of claim 1, wherein step (a) further comprises receiving, by the device, the transport layer connection request from the server responsive to the server deriving information about the client from a payload of a transport layer packet.

5. The method of claim 1, further comprising forwarding, by the device, data sent by the server via the first transport layer connection to the client via the second transport layer connection.

6. The method of claim 1, further comprising forwarding, by the device, to the server data received by the client that identifies the server's internet protocol address on the second network.

7. The method of claim 1, wherein step (a) further comprises hosting, by the device, the destination internet protocol address of the client on the first network.

8. The method of claim 1, wherein step (a) further comprises establishing, by the device, a listener process to listen for network traffic from the first network on the destination internet protocol address of the client on the first network.

9. The method of claim 1, wherein step (c) further comprises identifying the internet protocol address of the client on the second network mapped to the destination internet protocol address of the client hosted by the device on the first network.

10. The method of claim 1, wherein step (c) further comprises identifying the port of the client on the second network mapped to a destination port of the client hosted by the device on the first network.

11. A system comprising:
a device, intermediary to a server operating on a first network and a plurality of clients, receiving a transport layer connection request from the server to connect to a client, the client operating on a second network, the transport layer connection request identifying a destination internet protocol address and a destination port of the client on the first network; and a virtual server of the device establishing a first transport layer connection to the server on the first network, determining an internet protocol address of the client on the second network corresponding to the destination internet protocol address of the client on the first network, and establishing a second transport layer connection with an agent on the client at the internet protocol address on the second network, the agent establishing a third transport layer connection to the identified destination port, wherein the device associates a first connection record for the first transport layer connection with a second connection record for the second transport layer connection linked to the first transport layer connection.

12. The system of claim 11, wherein the second network is not routable from the first network.

13. The system of claim 11, wherein the device receives the transport layer connection request from the server responsive to initiating by the server to connect to the client.

14. The system of claim 11, wherein the device receives the transport layer connection request from the server responsive to the client triggering the server to initiate connection to the client.

15. The system of claim 11, wherein the device receives the transport layer connection request from the server responsive to the server deriving information about the client from a payload of a transport layer packet.

16. The system of claim 11, wherein the device forwards data sent by the server via the first transport layer connection to the client via the second transport layer connection and forwards to the server data received by the client that identifies the server's internet protocol address on the second network.

17. The system of claim 11, wherein the device hosts the destination internet protocol address of the client on the first network.

18. The system of claim 11, wherein the device establishes a listener process to listen for network traffic from the first network on the destination internet protocol address of the client on the first network.

19. The system of claim 11, wherein the virtual server identifies the internet protocol address of the client on the second network mapped to the destination internet protocol address of the client hosted by the device on the first network.

20. The system of claim 11, wherein the virtual server identifies the port of the client on the second network mapped to a destination port of the client hosted by the device on the first network.

\* \* \* \* \*